United States Patent
Gan et al.

(10) Patent No.: US 11,569,928 B2
(45) Date of Patent: Jan. 31, 2023

(54) CODED BIT TRANSMISSION METHOD AND APPARATUS

(71) Applicant: Huawei Technologies Co., Ltd., Shenzhen (CN)

(72) Inventors: Ming Gan, Shenzhen (CN); Wei Lin, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/141,847

(22) Filed: Jan. 5, 2021

(65) Prior Publication Data

US 2021/0126735 A1    Apr. 29, 2021

Related U.S. Application Data

(63) Continuation of application No. PCT/CN2019/094285, filed on Jul. 1, 2019.

(30) Foreign Application Priority Data

Jul. 6, 2018   (CN) .......................... 201810738637.9

(51) Int. Cl.
  *H04L 5/00*   (2006.01)
  *H04L 1/00*   (2006.01)
  *H04L 1/16*   (2006.01)

(52) U.S. Cl.
  CPC .......... *H04L 1/0005* (2013.01); *H04L 1/0068* (2013.01); *H04L 1/1685* (2013.01); *H04L 1/0071* (2013.01); *H04L 5/0007* (2013.01)

(58) Field of Classification Search
  None
  See application file for complete search history.

(56) References Cited

U.S. PATENT DOCUMENTS

| | | |
|---|---|---|
| 2002/0110094 A1 | 8/2002 | Reddy |
| 2008/0013505 A1 | 1/2008 | Trainin |
| 2009/0100300 A1* | 4/2009 | Kim ................ H03M 13/6525 714/702 |
| 2010/0266280 A1 | 10/2010 | Yamashita |
| 2012/0076219 A1 | 3/2012 | Srinivasa et al. |

(Continued)

FOREIGN PATENT DOCUMENTS

| | | |
|---|---|---|
| CN | 103125092 A | 5/2013 |
| CN | 105474595 A | 4/2016 |

(Continued)

OTHER PUBLICATIONS

Youhan Kim, "D2.0 PHY Comment Resolution—Part 4," IEEE 802.11-18/0934r1, May 9, 2018, 7 pages.

*Primary Examiner* — The Hy Nguyen
(74) *Attorney, Agent, or Firm* — Conley Rose, P.C.

(57) ABSTRACT

A coded bit transmission method and apparatus, to improve spectrum resource utilization and a data rate of a Wi-Fi system, where the method includes: A sender performing channel coding on information bits according to a used MCS, to generate coded bits; and the sender distributing the coded bits to a plurality of channel sets or a plurality of resource units according to a distribution rule. The MCS is an MCS used for each of the plurality of channel sets, or an MCS used for each of the plurality of resource units.

25 Claims, 23 Drawing Sheets

(56) References Cited

U.S. PATENT DOCUMENTS

| | | | |
|---|---|---|---|
| 2015/0085646 A1 | 3/2015 | Vannithamby et al. | |
| 2015/0349995 A1 | 12/2015 | Zhang et al. | |
| 2016/0301500 A1 | 10/2016 | Suh et al. | |
| 2017/0005846 A1* | 1/2017 | Mohamed | H04B 7/0413 |
| 2018/0248591 A1* | 8/2018 | Geng | H04B 7/0413 |
| 2019/0141717 A1* | 5/2019 | Yang | H04L 1/0041 |

FOREIGN PATENT DOCUMENTS

| | | |
|---|---|---|
| JP | 2009147626 A | 7/2009 |
| JP | 2013542671 A | 11/2013 |
| JP | 2014220675 A | 11/2014 |
| JP | 2017517215 A | 6/2017 |
| KR | 20130108356 A | 10/2013 |
| WO | 2010147426 A2 | 12/2010 |
| WO | 2017044591 A1 | 3/2017 |
| WO | 2017112818 A1 | 6/2017 |
| WO | 2019089207 A1 | 5/2019 |

* cited by examiner

Table 1

| Distribution manner | Punctured channel | Preset channel | Channel set | Formula | Modulation order | Quantity of coded bits distributed each time | Distribution pattern | Remarks |
|---|---|---|---|---|---|---|---|---|
| 1 | S20 | 20 MHz | P20 | (1) | 4 | 2 | 0, 1, 4, 5, ... | Fully loaded first |
|  |  |  | S40 | (1) | 4 | 2 | 2, 3, 6, 7, ... | Fully loaded later |
| 2 | S20 | 20 MHz | P20 | (2) | 4 | 2 | 0, 1, 6, 7, ... | Fully loaded simultaneously |
|  |  |  | S40 | (2) | 4 | 4 | 2, 3, 4, 5, 8, 9, 10, 11, ... | Fully loaded simultaneously |
| 3 | S20 | 20 MHz | P20 | (1) | 4 | 2 | 0, 1, 6, 7, ... | Fully loaded simultaneously |
|  |  |  | S40-L | (1) | 4 | 2 | 2, 3, 8, 9, ... | Fully loaded simultaneously |
|  |  |  | S40-R | (1) | 4 | 2 | 4, 5, 10, 11, ... | Fully loaded simultaneously |
| 4 | S40 | 20 MHz | P20 | (1) | 2 | 1 | 0, 3, ... | P20/S20 Fully loaded first simultaneously |

FIG. 14

| Distribution manner | Punctured channel | Preset channel | Channel set | Formula | Modulation order | Quantity of coded bits distributed each time | Distribution pattern | Remarks |
|---|---|---|---|---|---|---|---|---|
| 5 | S40 | 20 MHz | S20 | (1) | 2 | 1 | 1, 4, ... | P20/S20 Fully loaded first simultaneously |
| | | | S80 | (1) | 2 | 1 | 2, 5, ... | Fully loaded later |
| | | | P20 | (2) | 2 | 1 | 0, 6, ... | P20/S20 Fully loaded first simultaneously |
| | | | S20 | (2) | 2 | 1 | 1, 7, ... | P20/S20 Fully loaded first simultaneously |
| | | | S80 | (2) | 2 | 4 | 2, 3, 4, 5, 8, 9, 10, 11, ... | Fully loaded later |
| 6 | S40 | 20 MHz | P40 | (1) | 2 | 1 | 0, 2, ... | Fully loaded first |

FIG. 14 (continued)

| Distribution manner | Punctured channel | Preset channel | Channel set | Formula | Modulation order | Quantity of coded bits distributed each time | Distribution pattern | Remarks |
|---|---|---|---|---|---|---|---|---|
| 7 | S40 | 40 MHz | S80 | (1) | 2 | 1 | 1, 3, ... | Fully loaded later |
| | | | P40 | (2) | 2 | 1 | 0, 3, ... | Fully loaded first |
| | | | S80 | (2) | 2 | 2 | 1, 2, 4, 5, ... | Fully loaded later |
| 8 | S40 | 20 MHz | P40 | (2) | 2 | 2 | 0, 1, 6, 7, ... | Fully loaded first |
| | | | S80 | (2) | 2 | 4 | 2, 3, 4, 5, 8, 9, 10, 11, ... | Fully loaded later |

FIG. 14 (continued)

CODED BIT TRANSMISSION METHOD AND APPARATUS

CROSS-REFERENCE TO RELATED APPLICATIONS

This application is a continuation of International Patent Application No. PCT/CN2019/094285, filed on Jul. 1, 2019, which claims priority to Chinese Patent Application No. 201810738637.9, filed on Jul. 6, 2018. The disclosures of the aforementioned applications are hereby incorporated by reference in their entireties.

TECHNICAL FIELD

This application relates to the field of wireless communications, and in particular, to a coded bit transmission method and apparatus.

BACKGROUND

A next-generation Wi-Fi protocol, for example, a protocol later than 802.11ax, needs to be forward compatible, and therefore also supports an operating spectrum of an 802.11ax device, that is, supports frequency bands of 2.4 gigahertz (GHz), 5 GHz, and 6 GHz. According to the most recently opened free-of-charge 6-GHz frequency band, channel division is performed based on the frequency band, and a bandwidth that can be supported may exceed a maximum bandwidth of 160 megahertz (MHz) that is supported at 5 GHz, for example, 240 MHz or 320 MHz. That is, the next-generation Wi-Fi protocol is to introduce an ultra-high bandwidth to support data transmission with an extremely high throughput (EHT). In addition to the ultra-high bandwidth, the extremely high throughput supported by the next-generation Wi-Fi protocol may further increase a peak throughput using more streams, for example, increasing a quantity of streams to 16, through cooperation between a plurality of frequency bands (2.4 GHz, 5 GHz, and 6 GHz), or in another manner.

However, because a channel is busy, or some supported frequency bands such as 5 GHz and 6 GHz are occupied by another system such as a military radar system or a meteorological radar system, frequency bands available when a Wi-Fi system occupies an ultra-high bandwidth are discontinuous. Therefore, how to use the discontinuous frequency bands to implement an ultra-high bandwidth and support data transmission with an extremely high throughput becomes a problem that urgently needs to be resolved.

SUMMARY

Embodiments of this application provide a coded bit transmission method and apparatus, to improve spectrum resource utilization and a data rate of a Wi-Fi system.

To achieve the foregoing objective, the following technical solutions are provided in the embodiments of this application.

According to a first aspect, a coded bit distribution method is provided, including: performing channel coding on information bits according to a used modulation and coding scheme (MCS), to generate coded bits, where the MCS is an MCS used for each of a plurality of channel sets used for single-user preamble puncturing transmission, or an MCS used for each of a plurality of resource units used for orthogonal frequency-division multiple access (OFDMA) transmission; and then distributing the coded bits to the plurality of channel sets or the plurality of resource units according to a distribution rule.

According to the coded bit distribution method provided in this application, an MCS can be selected for each of the plurality of channel sets used for the single-user preamble puncturing transmission or each of the plurality of resource units used for the OFDMA transmission, the channel coding is performed on the information bits to generate the coded bits, and the coded bits are distributed to the plurality of channel sets or the plurality of resource units according to the distribution rule. The plurality of channel sets or the plurality of resource units may be continuous or discontinuous, and sizes of the plurality of channel sets or the plurality of resource units may be the same or different. Therefore, according to the coded bit distribution method provided in this application, a network device such as an access point (AP) and a terminal device such as a non-access point (NON-AP) station (NON-AP STA or STA) in a Wi-Fi system can transmit coded bits in a plurality of discontinuous channel sets or resource units, to avoid a case in which some of the plurality of channel sets or some of the plurality of resource units are idle, such that spectrum resource utilization and a data rate of the Wi-Fi system can be improved.

In a possible design method, the distribution rule may include: A quantity of coded bits distributed to the plurality of channel sets or the plurality of resource units in a cyclic polling manner meets a first preset relationship. The first preset relationship is used to determine a quantity of coded bits distributed to one channel set or resource unit at a time. For example, the first preset relationship may be as follows:

$$S_i = \max\left(1, \frac{s_i}{2}\right),$$

where $S_i$ is a quantity of coded bits distributed to an $i^{th}$ channel set or an $i^{th}$ resource unit at a time, $s_i$ is a modulation order of constellation point mapping included in an MCS for the $i^{th}$ channel set or the $i^{th}$ resource unit, $i \leq M$, and M is a quantity of the plurality of channel sets or a quantity of the plurality of resource units, for example, a modulation order of constellation point mapping included in quadrature amplitude modulation (QAM) with 16 constellation points (16QAM) is 4, that is, four bits are mapped to one OFDM symbol.

It can be understood that two adjacent groups of coded bits are definitely distributed to different channel sets or resource units, to reduce interference and obtain an interleaving gain in frequency domain.

In another possible design method, the distribution rule may include: A quantity of coded bits distributed to the plurality of channel sets or the plurality of resource units in a cyclic polling manner meets a second preset relationship. The second preset relationship is also used to determine a quantity of coded bits distributed to one channel set or resource unit at a time. For example, the second preset relationship may be as follows:

$$S_i = N_i \times \max\left(1, \frac{s_i}{2}\right),$$

where $S_i$ is a quantity of coded bits distributed to an $i^{th}$ channel set or an $i^{th}$ resource unit at a time, $s_i$ is a modulation order of constellation point mapping included in an MCS for the $i^{th}$ channel set or the $i^{th}$ resource unit, $i \leq M$, M is a quantity of the plurality of channel sets or a quantity of the plurality of resource units, $N_i$ is a quantity of preset channels included in the $i^{th}$ channel set, or a quantity of preset resource units included in the $i^{th}$ resource unit, and the quantity of preset resource units is a positive integer obtained by rounding off a quotient of a quantity of tones included in the $i^{th}$ resource unit and a quantity of tones included in the preset resource unit.

It can be understood that the two adjacent groups of coded bits are definitely distributed to the different channel sets or resource units, to reduce the interference and obtain the interleaving gain in frequency domain.

For example, the preset channel may be a channel with a minimum bandwidth supported by a Wi-Fi system, or may be a channel whose channel bandwidth is a common divisor of bandwidths of the plurality of channel sets. For example, there are three channel sets in total, and bandwidths of the three channel sets are 40 MHz, 80 MHz, and 160 MHz. In this case, a bandwidth of the preset channel may be 20 MHz or 40 MHz.

Likewise, the preset resource unit may be a minimum resource unit supported by a Wi-Fi system, or may be a resource unit including a quantity of tones that is a common divisor of a quantity of tones included in the plurality of resource units. For example, there are three resource units (RUs) in total: an RU106, an RU242, and an RU484. In this case, the preset resource unit may be an RU26 or the RU106.

It can be understood that a same MCS is used for the plurality of channel sets used for the single-user preamble puncturing transmission, or a same MCS is used for the plurality of resource units used for the OFDMA transmission, to reduce operation complexity of coding, modulating, and distributing the information bits.

In another possible design method, the distribution rule may further include: if at least one of the plurality of channel sets is fully loaded with coded bits distributed to the channel set, stopping distributing coded bits to the at least one of the plurality of channel sets, continuing to distribute coded bits to another channel set in the plurality of channel sets according to the distribution rule, and after all the plurality of channel sets are fully loaded with coded bits distributed to the channel sets, continuing to perform a next round of distribution, in order to send coded bits using all spectrum resources in all the channel sets, thereby avoiding idleness of some spectrum resources, and further improving the spectrum resource utilization and the data rate.

In another possible design method, the distribution rule may further include: if at least one of the plurality of resource units is fully loaded with coded bits distributed to the resource unit, stopping distributing coded bits to the at least one of the plurality of resource units, continuing to distribute coded bits to another resource unit in the plurality of resource units according to the distribution rule, and after all the plurality of resource units are fully loaded with coded bits distributed to the resource units, continuing to perform a next round of distribution, in order to transmit coded bits using all tones in all the resource units, thereby avoiding idleness of some tones, and further improving spectrum the resource utilization and the data rate.

It should be noted that whether the plurality of channel sets or the plurality of resource units are continuous is not limited in this application. Therefore, the plurality of channel sets may be continuous or discontinuous in frequency domain. Correspondingly, the plurality of resource units may be continuous or discontinuous in frequency domain.

Likewise, in this application, whether sizes of the plurality of channel sets or the plurality of resource units are the same does not need to be limited either. Therefore, the sizes of the plurality of channel sets may be the same or different. Correspondingly, the sizes of the plurality of resource units may be the same or different.

Optionally, for the OFDMA transmission, the plurality of resource units may be allocated to one station or one station set. For example, if both resource units A and B are used to carry coded bits of stations 1 and 2, the stations 1 and 2 may be treated as one station set.

Optionally, the plurality of channel sets may be channel sets including at least one of the following bandwidths: 20 megahertz MHz, 40 MHz, 80 MHz, and 160 MHz.

Optionally, if there are a plurality of streams and there are no plurality of segments, a channel parser or a resource unit parser that performs the coded bit distribution method is located after a stream parser, to simplify a process of sending different streams. Likewise, if there are a plurality of segments, a channel parser or a resource unit parser that performs the coded bit distribution method is located after a segment parser, to simplify a process of sending different segments. Certainly, if there are both a plurality of streams and a plurality of segments, because a segmentation operation is usually specific to one stream, that is, a segment parser is usually located after a stream parser, a channel parser or a resource unit parser that distributes coded bits is still located after the segment parser.

According to a second aspect, a coded bit receiving method is provided, including: receiving, according to a receiving and combination rule, coded bits that are carried in a plurality of channel sets used for single-user preamble puncturing transmission or a plurality of resource units used for OFDMA transmission; and then performing channel decoding on the coded bits according to a used MCS, to generate information bits, where the MCS is an MCS used for each of the plurality of channel sets, or an MCS used for each of the plurality of resource units.

According to the coded bit receiving method provided in this application, an MCS can be selected for each of the plurality of channel sets used for the single-user preamble puncturing transmission or each of the plurality of resource units used for the OFDMA transmission; and then the coded bits received from the plurality of channel sets or the plurality of resource units are received according to the receiving and combination rule, and the channel decoding is performed on the received coded bits according to the selected MCS, to generate the information bits. The plurality of channel sets or the plurality of resource units may be continuous or discontinuous. Therefore, according to the coded bit receiving method provided in this application, a network device such as an AP or a terminal device such as a station (STA) in a Wi-Fi system can transmit data in a plurality of continuous or discontinuous channel sets or resource units, to avoid a case in which some of the plurality of channel sets or some of the plurality of resource units are idle, such that spectrum resource utilization and a data rate of the Wi-Fi system can be improved.

In a possible design method, the receiving and combination rule may include: A quantity of coded bits received from the plurality of channel sets or the plurality of resource units in a cyclic polling manner meets a first preset relationship. The first preset relationship is used to determine a quantity of coded bits received from one channel set or resource unit at a time. For example, the first preset relationship may be as follows:

$$S_i = \max\left(1, \frac{s_i}{2}\right),$$

where $S_i$ is a quantity of coded bits received from an $i^{th}$ channel set or an $i^{th}$ resource unit at a time, $s_i$ is a modulation order of constellation point mapping included in an MCS for the $i^{th}$ channel set or the $i^{th}$ resource unit, $i \leq M$, and M is a quantity of the channel sets or a quantity of the plurality of resource units.

It can be understood that, according to the foregoing receiving method, two adjacent groups of coded bits are definitely coded bits received from different channel sets or resource units, to reduce interference and obtain an interleaving gain in frequency domain.

In another possible design method, the receiving and combination rule may include: A quantity of coded bits received from the plurality of channel sets or the plurality of resource units in a cyclic polling manner meets a second preset relationship. The second preset relationship is also used to determine a quantity of coded bits received from one channel set or resource unit at a time. For example, the second preset relationship may be as follows:

$$S_i = N_i \times \max\left(1, \frac{s_i}{2}\right),$$

where $S_i$ is a quantity of coded bits received from an $i^{th}$ channel set or an $i^{th}$ resource unit at a time, $s_i$ is a modulation order of constellation point mapping included in an MCS for the $i^{th}$ channel set or the $i^{th}$ resource unit, $i \leq M$, M is a quantity of the plurality of channel sets or a quantity of the plurality of resource units, $N_i$ is a quantity of preset channels included in the $i^{th}$ channel set, or a quantity of preset resource units included in the $i^{th}$ resource unit, and the quantity of preset resource units is a positive integer obtained by rounding off a quotient of a quantity of tones included in the $i^{th}$ resource unit and a quantity of tones included in the preset resource unit.

It can be understood that the two adjacent groups of coded bits are definitely coded bits received from the different channel sets or resource units, to reduce the interference and obtain the interleaving gain in frequency domain.

For example, the preset channel may be a channel with a minimum bandwidth supported by a Wi-Fi system, or may be a channel whose bandwidth is a common divisor of bandwidths of the plurality of channel sets.

Likewise, the preset resource unit may be a minimum resource unit supported by a Wi-Fi system, or may be a resource unit including a quantity of tones that is a common divisor of a quantity of tones included in the plurality of resource units.

It can be understood that a same MCS is used for all of the plurality of channel sets used for the single-user preamble puncturing transmission, or a same MCS is used for all of the plurality of resource units used for the OFDMA transmission, to reduce operation complexity of receiving and combining the coded bits and performing channel decoding to generate the information bits.

In another possible design method, the receiving and combination rule may further include: if all coded bits carried in at least one of the plurality of channel sets are received, stopping receiving coded bits from the at least one of the plurality of channel sets, continuing to receive coded bits from another channel set in the plurality of channel sets according to the receiving and combination rule, and after all coded bits carried in the plurality of channel sets are received, continuing to perform a next round of receiving, in order to receive coded bits using all spectrum resources in all the channel sets, thereby avoiding idleness of some spectrum resources, and further improving the spectrum resource utilization and the data rate.

In another possible design method, the receiving and combination rule may further include: if all coded bits carried in at least one of the plurality of resource units are received, stopping receiving coded bits from the at least one of the plurality of resource units, continuing to receive coded bits from another resource unit in the plurality of resource units according to the receiving and combination rule, and after all coded bits carried in the plurality of resource units are received, continuing to perform a next round of receiving, in order to receive coded bits using all tones in all the resource units, thereby avoiding idleness of some tones, and further improving spectrum the resource utilization and the data rate.

It should be noted that whether the plurality of channel sets or the plurality of resource units are continuous is not limited in this application. Therefore, the plurality of channel sets may be continuous or discontinuous in frequency domain. Correspondingly, the plurality of resource units may be continuous or discontinuous in frequency domain.

Likewise, in this application, whether sizes of the plurality of channel sets or the plurality of resource units are the same does not need to be limited either. Therefore, the sizes of the plurality of channel sets may be the same or different. Correspondingly, the sizes of the plurality of resource units may be the same or different.

Optionally, for the OFDMA transmission, the plurality of resource units may be allocated to one station or one station set. For example, if both resource units A and B are used to carry coded bits of stations 1 and 2, the stations 1 and 2 may be treated as one station set.

Optionally, the plurality of channel sets may be channel sets including at least one of the following bandwidths: 20 megahertz MHz, 40 MHz, 80 MHz, and 160 MHz.

It should be noted that the receiving and combination rule for the coded bits in any one of the second aspect or the possible implementations of the second aspect corresponds to the distribution rule for the coded bits in any one of the first aspect or the possible implementations of the first aspect, such that a sender and a receiver of the coded bits can reliably communicate with each other.

It can be understood that the method in any one of the first aspect or the possible implementations of the first aspect and the method in any one of the second aspect or the possible implementations of the second aspect may be separately implemented, or may be used in combination. This is not limited in this application.

According to a third aspect, a communications apparatus is provided, configured to perform the method in any one of the first aspect or the possible implementations of the first aspect, and/or the method in any one of the second aspect or the possible implementations of the second aspect.

According to a fourth aspect, a communications apparatus is provided, including: a processor, where the processor is coupled to a memory; and the memory, configured to store a computer program. The processor is configured to execute the computer program stored in the memory, such that the apparatus performs the method in any one of the first aspect or the possible implementations of the first aspect, and/or the method in any one of the second aspect or the possible implementations of the second aspect.

In a possible design, the apparatus in the fourth aspect includes one or more processors and a transceiver. The one or more processors are configured to support the apparatus in the fourth aspect in performing a coded bit distribution function in the foregoing method, for example, performing channel coding on information bits to generate coded bits, and distributing the coded bits to a plurality of channel sets or a plurality of resource units according to a distribution rule. The transceiver is configured to support the apparatus in the fourth aspect in communicating with another device, to implement a receiving and/or sending function, for example, modulating distributed coded bits, and sending modulated bits using a radio frequency device.

Optionally, the apparatus in the fourth aspect may further include one or more memories. The memory is configured to be coupled to the processor, and the memory stores a program instruction and/or data that are/is necessary for a network device. The one or more memories may be integrated with the processor, or may be disposed separately from the processor. This is not limited in this application.

The apparatus in the fourth aspect may be a network device such as an access point, or may be a terminal device such as a station. The transceiver may be a transceiver circuit. Optionally, the transceiver may be alternatively an input/output circuit or an interface.

The apparatus in the fourth aspect may be alternatively a communications chip, and the communications chip may be used for the network device and/or the terminal device. The transceiver may be an input/output circuit or an interface of the communications chip.

In another possible design, the apparatus includes a transceiver, a processor, and a memory. The processor is configured to control the transceiver to send or receive a signal. The memory is configured to store a computer program. The processor is configured to run the computer program in the memory, such that the apparatus performs the method in any one of the first aspect or the possible implementations of the first aspect.

In a possible design, the apparatus includes one or more processors and a transceiver. The one or more processors are configured to support the apparatus in the fourth aspect in performing a coded bit receiving function in the foregoing method, for example, combining, according to a receiving and combination rule, coded bits received from a plurality of channel sets or a plurality of resource units, and performing channel decoding on combined coded bits to generate information bits. The transceiver is configured to support the apparatus in the fourth aspect in communicating with another device, to implement a receiving and/or sending function, for example, performing down-conversion and demodulation on a received radio frequency signal to obtain coded bits.

Optionally, the apparatus in the fourth aspect may further include one or more memories. The memory is configured to be coupled to the processor, and the memory stores a program instruction and/or data that are/is necessary for a network device. The one or more memories may be integrated with the processor, or may be disposed separately from the processor. This is not limited in this application.

The apparatus in the fourth aspect may be a terminal device such as a station, or may be a network device such as an access point. The transceiver may be a transceiver circuit. Optionally, the transceiver may be alternatively an input/output circuit or an interface.

The apparatus in the fourth aspect may be alternatively a communications chip, and the communications chip may be used for the terminal device and/or the network device. The transceiver may be an input/output circuit or an interface of the communications chip.

In another possible design, the apparatus in the fourth aspect includes a transceiver, a processor, and a memory. The processor is configured to control the transceiver to send or receive a signal. The memory is configured to store a computer program. The processor is configured to run the computer program in the memory, such that the apparatus in the fourth aspect performs the method in any one of the second aspect or the possible implementations of the second aspect.

It should be noted that the coded bit distribution function and the coded bit receiving function may be alternatively performed by one apparatus on different communication links, such that unidirectional and/or bidirectional communication in a form such as a one-to-one form, a one-to-many form, a many-to-one form, or a many-to-many form can be implemented between a network device and a terminal device, between different network devices, or between different terminal devices.

For example, a station 1 sends coded bits to an access point A in an uplink direction, and also receives, in a downlink direction, coded bits sent by the access point A. Correspondingly, the access point A receives, in the uplink direction, the coded bits sent by the station 1, and also sends the coded bits to the station 1 in the downlink direction.

For example, an access point B sends coded bits sent by an access point C, and also receives coded bits sent by the access point C. Correspondingly, the access point C receives the coded bits to the access point B, and also sends the coded bits to the access point B.

For example, an access point D sends coded bits to both stations 2 and 3. For another example, a station 4 receives coded bits delivered by both access points E and F. For still another example, both access points G and H send coded bits to stations 5 and 6. Correspondingly, both the stations 5 and 6 receive the coded bits sent by the access points G and H.

According to a fifth aspect, a communications system is provided, including: a communications apparatus configured to perform any one of the third aspect or the possible implementations of the third aspect, and a communications apparatus configured to perform any one of the fourth aspect or the possible implementations of the fourth aspect.

According to a sixth aspect, a computer-readable storage medium is provided, configured to store a computer program. The computer program includes an instruction used to perform the method in any one of the first aspect or the possible implementations of the first aspect, and/or an instruction used to perform the method in any one of the second aspect or the possible implementations of the second aspect.

According to a seventh aspect, a computer program product is provided. The computer program product includes computer program code. When the computer program code is run on a computer, the computer is enabled to perform the method in any one of the first aspect or the possible implementations of the first aspect, and/or the method in any one of the second aspect or the possible implementations of the second aspect.

According to an eighth aspect, a chip system is provided. The chip system includes a processor and a transceiver interface. The processor is configured to implement the processing function in the first aspect or the second aspect. The transceiver interface is configured to implement the sending/receiving function in the first aspect or the second aspect.

In a possible design, the chip system further includes a memory. The memory is configured to store a program instruction and data for implementing the functions in the first aspect or the second aspect.

The chip system may include a chip, or may include a chip and another discrete device.

According to the methods provided in the embodiments of this application, a coded bit transmission method may be provided. The method is applicable to a Wi-Fi system to distribute coded bits to a plurality of channel sets used for single-user preamble puncturing transmission or a plurality of resource units used for OFDMA transmission, and/or receive coded bits from a plurality of channel sets used for single-user preamble puncturing transmission or a plurality of resource units used for OFDMA transmission.

BRIEF DESCRIPTION OF DRAWINGS

FIG. 14 is a table providing summary information of distribution manners according to embodiments of this application.

DESCRIPTION OF EMBODIMENTS

Figure 1:
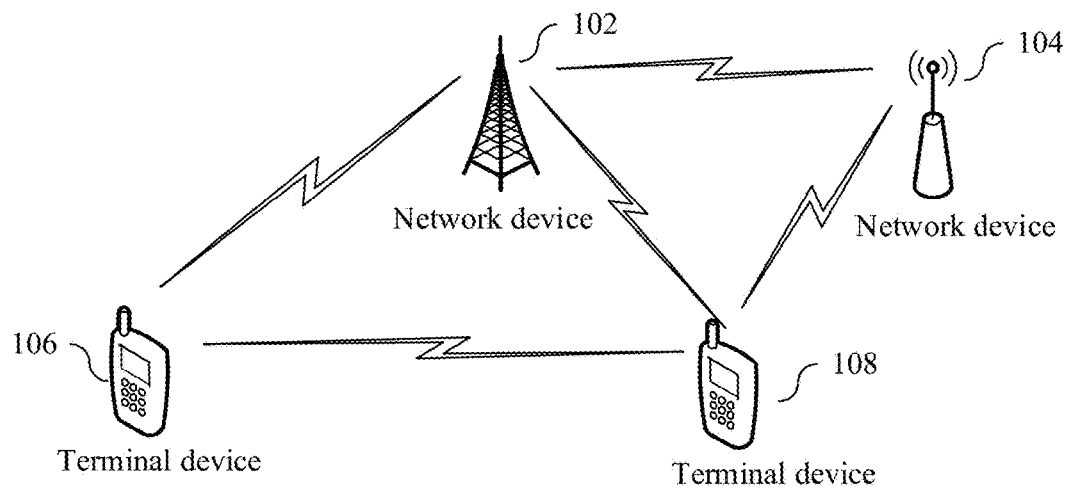
FIG. 1 is a schematic architectural diagram of a communications system for which a coded bit transmission method and apparatus provided in an embodiment of this application are used.

The following describes technical solutions of this application with reference to the accompanying drawings.

The technical solutions provided in the embodiments of this application may be used for a Wi-Fi system, or may be used for a 4th generation (4G) mobile communications system such as a Long-Term Evolution (LTE) system or a Worldwide Interoperability for Microwave Access (WiMAX) communications system, or a 5th generation (5G) system such as a new radio (NR) system.

All aspects, embodiments, or features are presented in this application by describing a system that may include a plurality of devices, components, modules, or the like. It should be appreciated and understood that, each system may include another device, component, module, or the like, and/or may not include all devices, components, modules, or the like discussed with reference to the accompany drawings. In addition, a combination of these solutions may be used.

In addition, in the embodiments of this application, the word "is an example" or "for example" is used to represent giving an example, an illustration, or a description. Any embodiment or design scheme described as an "example" in this application should not be explained as being more preferred or having more advantages than another embodiment or design scheme. Exactly, "for example" is used to present a concept in a specific, but non-limiting manner.

In the embodiments of this application, one of information, signal, message, or channel may be used sometimes. It should be noted that expressed meanings are consistent when differences are not emphasized. One of "of", "relevant", and "corresponding" may be used sometimes. It should be noted that expressed meanings are consistent when differences are not emphasized.

In the embodiments of this application, a subscript such as $W_1$ may be sometimes written in a non-subscript form such as W1 due to a clerical error. Expressed meanings are consistent when differences are not emphasized.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of a new service scenario, the technical solutions provided in the embodiments of this application are also applicable to a similar technical problem.

In addition, terms "including", "having", or any other variant thereof mentioned in descriptions of this application, are intended to cover a non-exclusive inclusion. For example, a process, a method, a system, a product, or a device that includes a series of steps or units is not limited to the listed steps or units, but optionally further includes another unlisted step or unit, or optionally further includes another inherent step or unit of the process, the method, the product, or the device.

For ease of understanding the embodiments of this application, a communications system shown in FIG. 1 is first used as an example to describe in detail a communications system to which the embodiments of this application are applicable. FIG. 1 is a schematic diagram of a communications system to which a communication method according to an embodiment of this application is applicable. As shown in FIG. 1, the communications system includes a network device 102 and a terminal device 106. A plurality of antennas may be configured for each of the network device 102 and the terminal device 106. Optionally, the communications system may further include another network device and/or another terminal device, for example, a network device 104 and a terminal device 108, and a plurality of antennas may also be configured for each of the network device 104 and the terminal device 108.

It should be understood that the network device may further include a plurality of components (for example, a processor, an encoder, a decoder, a modulator, a demodulator, a multiplexer, and a demultiplexer) related to signal sending and receiving.

For example, the network device may be a device with a wireless sending/receiving function or a chip that can be disposed in the device. The device includes but is not limited to an access point in a Wi-Fi system, an evolved NodeB (eNB), a home NodeB (for example, a home evolved NodeB, or a home NodeB (HNB)), a wireless relay node, a wireless backhaul node, a transmission point (TP) or transmission and reception point (TRP), or the like; or may be a gNB in a new radio (NR) system, a communications server, a router, a switch, a bridge, a computer, or the like.

For example, the terminal device may also be referred to as a user equipment (UE), an access terminal, a subscriber unit, a subscriber station, a mobile station, a mobile console, a remote station, a remote terminal, a mobile device, a user terminal, a wireless communications device, a user agent, a user apparatus, or the like. In the embodiments of this application, the terminal device may be a non-access point station (e.g., NON-STA or STA), a mobile phone, a tablet (Pad), a computer with a wireless sending/receiving function, a virtual reality (VR) terminal, a wireless terminal in a smart city, a wireless terminal in a smart home, or the like. In the embodiments of this application, the terminal device and a chip that can be disposed in the terminal device are collectively referred to as a terminal device.

In the communications system, one network device or one terminal device may be treated as one node, and communication in any form such as a one-to-one form, a one-to-many form, a many-to-one form, or a many-to-many form may exist between any two or more nodes. For example, one network device may communicate with at least one terminal device and/or at least one network device, and one terminal device may also communicate with at least one network device and/or at least one terminal device. For example, as shown in FIG. 1, the network device 102 may communicate with the terminal device 106, or may communicate with the network device 104, or may communicate with at least two of the terminal device 106, the terminal device 108, and the network device 104. For another example, the terminal device 108 may communicate with the network device 102, or may communicate with the terminal device 106, or may communicate with at least two of the network device 102, the network device 104, and the terminal device 106.

It should be understood that FIG. 1 is only a simplified schematic diagram of an example for ease of understanding. The communications system may further include another network device or another terminal device not shown in FIG. 1.

Figure 2:
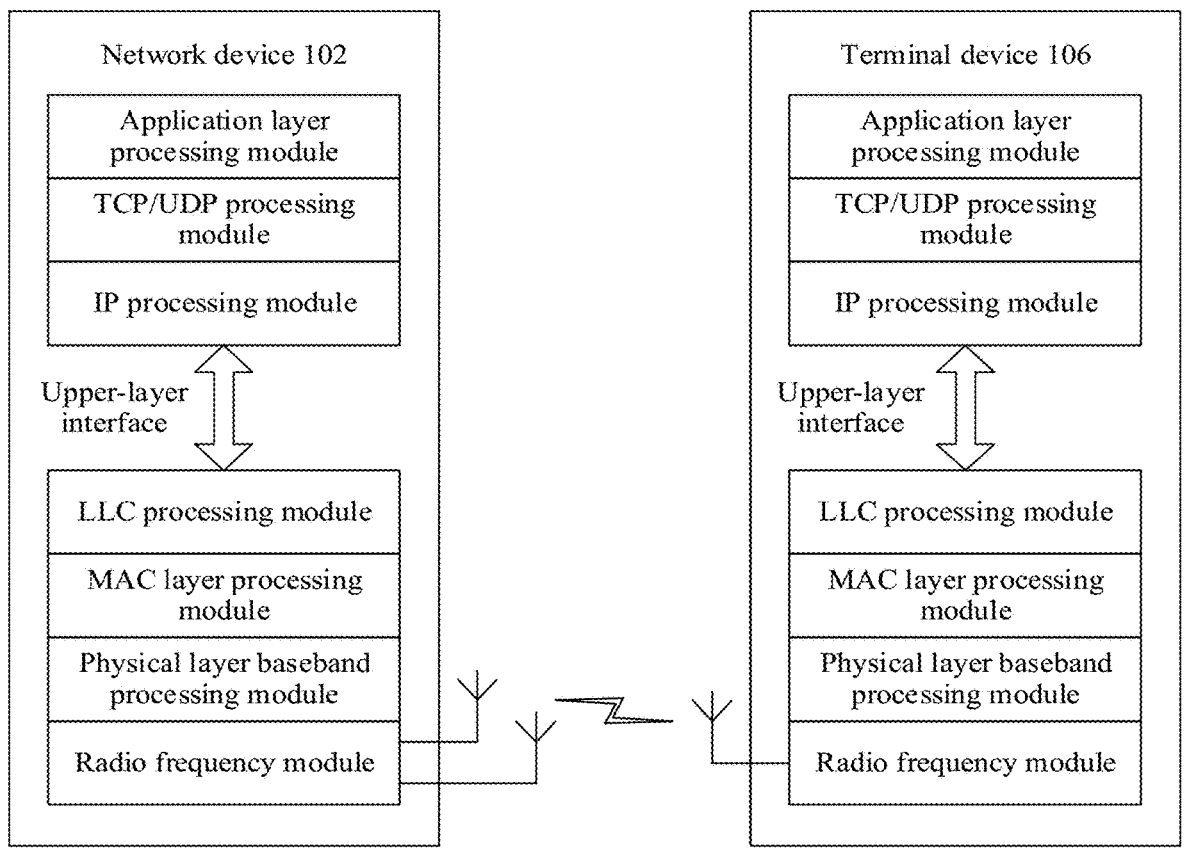
FIG. 2 is a schematic diagram of internal structures of a network device 102 and a terminal device 106.

FIG. 2 is a schematic diagram of internal structures of the network device 102 and the terminal device 106. As shown in FIG. 2, the network device 102 and the terminal device 106 each include an application layer processing module, a Transmission Control Protocol (TCP)/user datagram protocol (UDP) processing module, an Internet Protocol (IP) processing module, a logical link control (LLC) processing module, a media access control (MAC) layer processing module, a physical layer baseband processing module, a radio frequency module, and an antenna. The IP processing module is connected to the LLC processing module through an upper-layer interface.

For a sender such as the network device 102, the physical layer baseband processing module is configured to perform channel coding on binary user data, that is, information bits, to generate coded bits, modulate the coded bits to generate modulated symbols, then perform up-conversion on the modulated symbols to generate a radio frequency signal, and send the radio frequency signal using the antenna. For a receiver such as the terminal device 106, the physical layer baseband processing module is configured to perform down-conversion and demodulation on the radio frequency signal received by the radio frequency module to recover the coded bits, and perform channel decoding on the coded bits to recover the information bits, in order to complete sending and receiving of the information bits, that is, the binary user data.

It should be noted that FIG. 2 shows only the network device 102 configured with two antennas and the terminal device 106 configured with one antenna. In actual application, one or more antennas may be configured for each of the network device 102 and the terminal device 106.

Actually, in modern communications systems, a multiple-antenna technology is widely used for, for example, Wi-Fi, LTE, and 5G NR systems. A node such as the network device 102 or the terminal device 106 may send or receive a signal using a plurality of antennas. This is referred to as a multiple-input multiple-output (MIMO) technology in the following. In a communications system that supports MIMO, a node may obtain gains such as diversity and multiplexing gains by adjusting a MIMO sending/receiving solution, for example, adjusting a weight of a transmit antenna or allocating different signals to different antennas, to increase a system capacity and improve system reliability. In the embodiments of this application, data transmitted between a transmit antenna and a receive antenna of each pair is treated as a spatial stream (SS), referred to as a stream for short.

In actual application, different communications systems may support a same frequency band. For example, an existing Wi-Fi system, a military radar system, and a meteorological radar system all support frequency bands of 5 GHz and 6 GHz. When some frequency bands supported by the Wi-Fi system are occupied by the military radar system or the meteorological radar system, a remaining frequency band may be discontinuous.

To improve spectrum utilization and a data rate, an existing Wi-Fi protocol such as Institute of Electrical and Electronics Engineers (IEEE) 802.11ax proposes data transmission in a preamble puncturing mode, and allows a network device such as an access point to aggregate at least two discontinuous frequency bands for use, to improve spectrum resource utilization and a data rate of the network device. For example, the access point is allowed to aggregate discontinuous frequency bands of 20 MHz and 40 MHz for use.

Figure 3A:
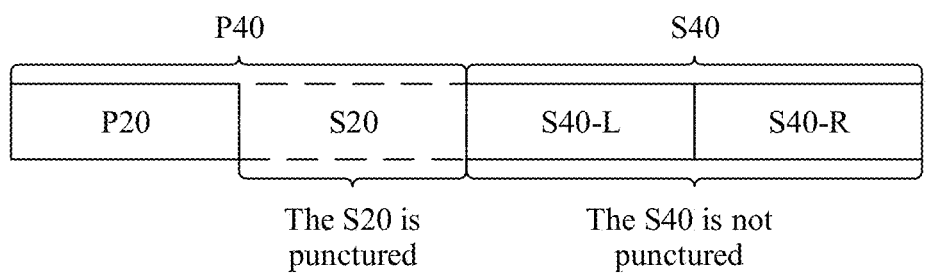
FIG. 3A is a schematic diagram of a preamble puncturing manner 1 corresponding to an 80-MHz bandwidth in an existing Wi-Fi system.
Figure 3B:
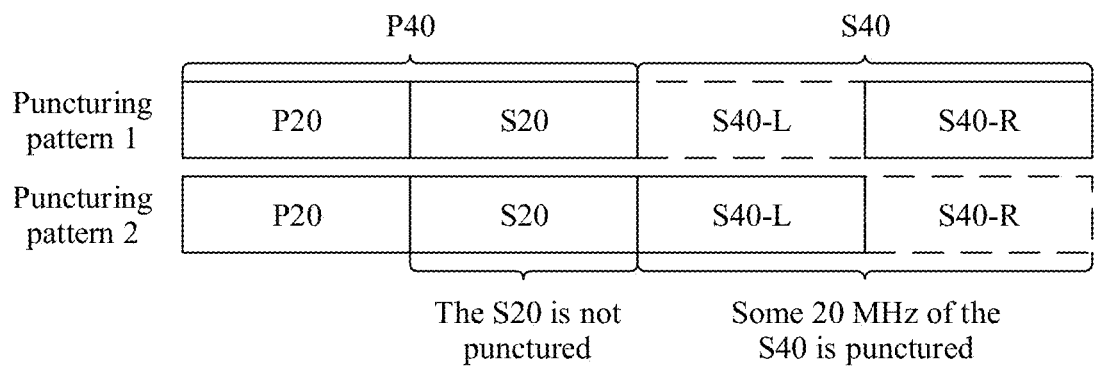
FIG. 3B is a schematic diagram of a preamble puncturing manner 2 corresponding to an 80-MHz bandwidth in an existing Wi-Fi system.
Figure 3C:
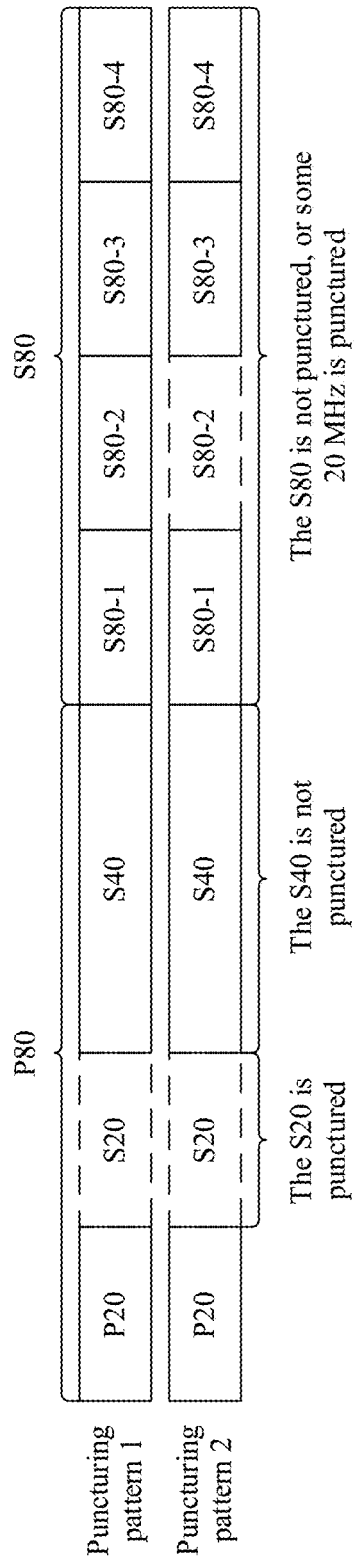
FIG. 3C is a schematic diagram of a preamble puncturing manner 1 corresponding to a 160-MHz bandwidth in an existing Wi-Fi system.
Figure 3D:
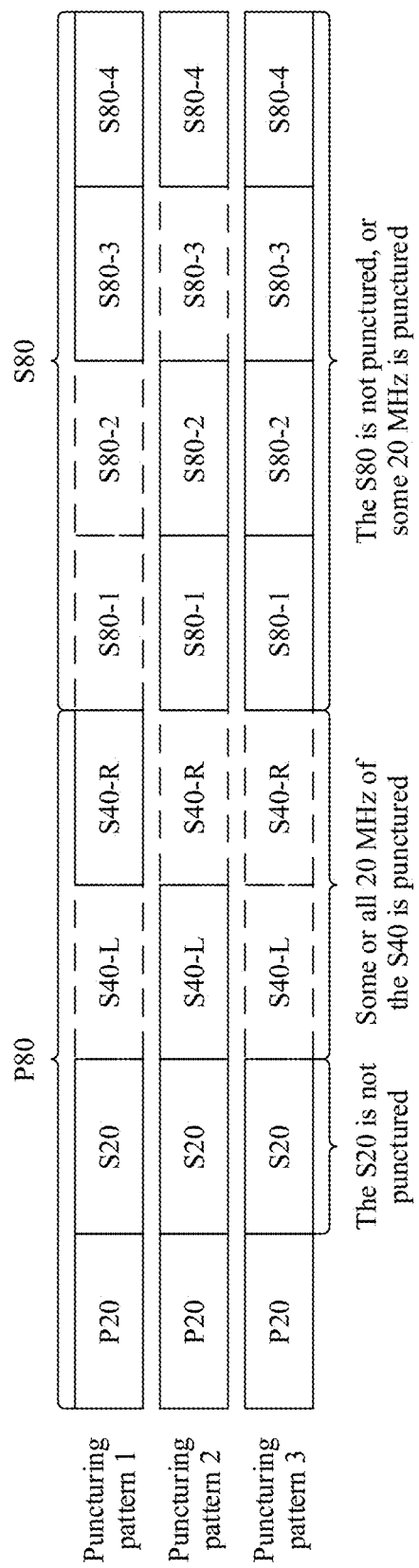
FIG. 3D is a schematic diagram of a preamble puncturing manner 2 corresponding to a 160-MHz bandwidth in an existing Wi-Fi system.

FIG. 3A and FIG. 3B respectively show a preamble puncturing manner 1 and a preamble puncturing manner 2 that can be supported by 802.11ax at an 80-MHz bandwidth. FIG. 3C and FIG. 3D respectively show a preamble puncturing manner 1 and a preamble puncturing manner 2 that can be supported by 802.11ax at a 160-MHz bandwidth. Puncturing in 802.11ax means not transmitting a Wi-Fi signal on an occupied frequency band, and not transmitting a physical layer preamble or data part. Puncturing transmission in the present disclosure may be the puncturing in 802.11ax, or may be transmitting a physical layer preamble on a punctured channel, but not transmitting a data part.

As shown in FIG. 3A and FIG. 3B, the 80-MHz bandwidth may be divided into primary 20 MHz (P20), secondary 20 MHz (S20), and secondary 40 MHz (S40). The P20 and the S20 may also be collectively referred to as primary 40 MHz (P40). The S40 may be further divided into S40 left 20 MHz (S40-L) and S40 right 20 MHz (S40-R). Because the P20 is mainly used to transmit control signaling, the P20 cannot be punctured.

For example, FIG. 3A shows a puncturing pattern of the preamble puncturing manner 1 at the 80-MHz bandwidth: The S20 is punctured, and the S40 is not punctured. For example, FIG. 3B shows two puncturing patterns of the preamble puncturing manner 2 at the 80-MHz bandwidth: The S20 is not punctured, but the S40-L is punctured (corresponding to a puncturing pattern 1 in FIG. 3B); and S20 is not punctured, but the S40-R is punctured (corresponding to a puncturing pattern 2 in FIG. 3B).

As shown in FIG. 3C and FIG. 3D, the 160-MHz bandwidth may be divided into P20, S20, S40, and secondary 80 MHz (S40). The P20, the S20, and the S40 may also be collectively referred to as primary 80 MHz (P80). The S80 may be further divided into S80-1, S80-2, S80-3, and S80-4, and a bandwidth of each of the S80-1, the S80-2, the S80-3, and the S80-4 is 20 MHz.

For example, FIG. 3C shows two puncturing patterns of the preamble puncturing manner 1 at the 160-MHz bandwidth: The S20 is punctured, and the S40 and the S80 are not punctured (corresponding to a puncturing pattern 1 in FIG. 3C); and the S20 is punctured, the S40 is not punctured, and some 20 MHz of the S80 is punctured (corresponding to a puncturing pattern 2 in FIG. 3C).

For example, FIG. 3D shows three puncturing patterns of the preamble puncturing manner 2 at the 160-MHz bandwidth: The S20 is not punctured, and the S40-L is punctured (corresponding to a puncturing pattern 1 in FIG. 3D); the S20 is not punctured, and the S40-R is punctured (corresponding to a puncturing pattern 2 in FIG. 3D); and the S20 is not punctured, and the S40 is entirely punctured (corresponding to a puncturing pattern 3 in FIG. 3D).

It should be noted that, in the embodiments of this application, that the S80 is not punctured or that at least one 20 MHz of the S80 is punctured is not necessarily required in the three puncturing patterns shown in FIG. 3D.

However, in the puncturing manner 2 for 80 MHz and the puncturing manner 2 for 160 MHz in 802.11ax, which 20 MHz is punctured is not specified. In actual application, resource allocation indication information in some common fields in an HE-SIG B in a physical layer preamble in an HE PPDU in 802.11ax may be used to indicate which 20 MHz is punctured.

However, transmission in the foregoing preamble puncturing manners can be used only in a downlink multi-user transmission scenario, for example, downlink OFDMA, and is not applicable to a single-user transmission scenario. In addition, to reduce complexity of sending or receiving a signal, 802.11ax stipulates that a terminal device such as a station performs transmission only on one resource unit in downlink OFDMA transmission, that is, transmits an uplink signal in a group of continuous tones. It can be understood that, when a resource unit including the group of continuous tones reaches a maximum quantity of tones that can be supported by a configured system bandwidth, the terminal device is in a single-user transmission scenario, or one resource unit is allocated only to one terminal device for transmission. This is also referred to as single-user transmission. Otherwise, the terminal device is in OFDMA transmission, that is, in addition to the terminal device, there is another terminal device that performs data transmission with a same access point in another resource unit.

A transmission method, mentioned in this application, that is applicable to single-user transmission is further applicable to MU-MIMO transmission (excluding partial-bandwidth MU-MIMO mentioned in 802.11ax).

The OFDMA transmission mentioned in this application includes pure OFDMA transmission, that is, each resource unit is allocated to one station; and further includes hybrid MU-MIMO and OFDMA transmission, that is, the partial-bandwidth OFDMA transmission mentioned in 802.11ax, in which some resource units are allocated to one station set for MU-MIMO transmission, and some resource units are allocated to a single station for single-station transmission.

Figure 4A:
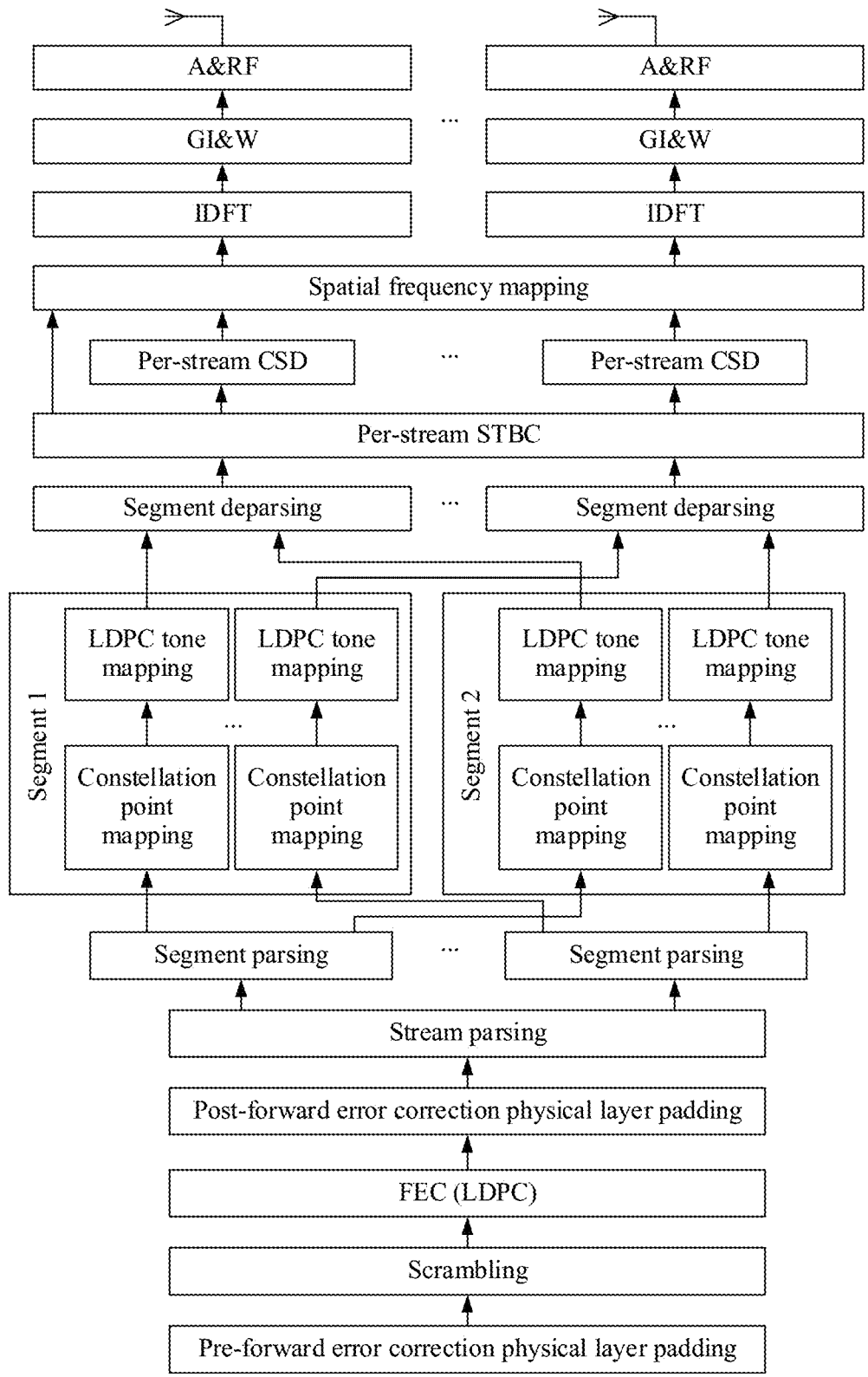
FIG. 4A is a schematic diagram of a transmission procedure of a single station on a continuous 160-MHz frequency band in an existing Wi-Fi system.
Figure 4B:
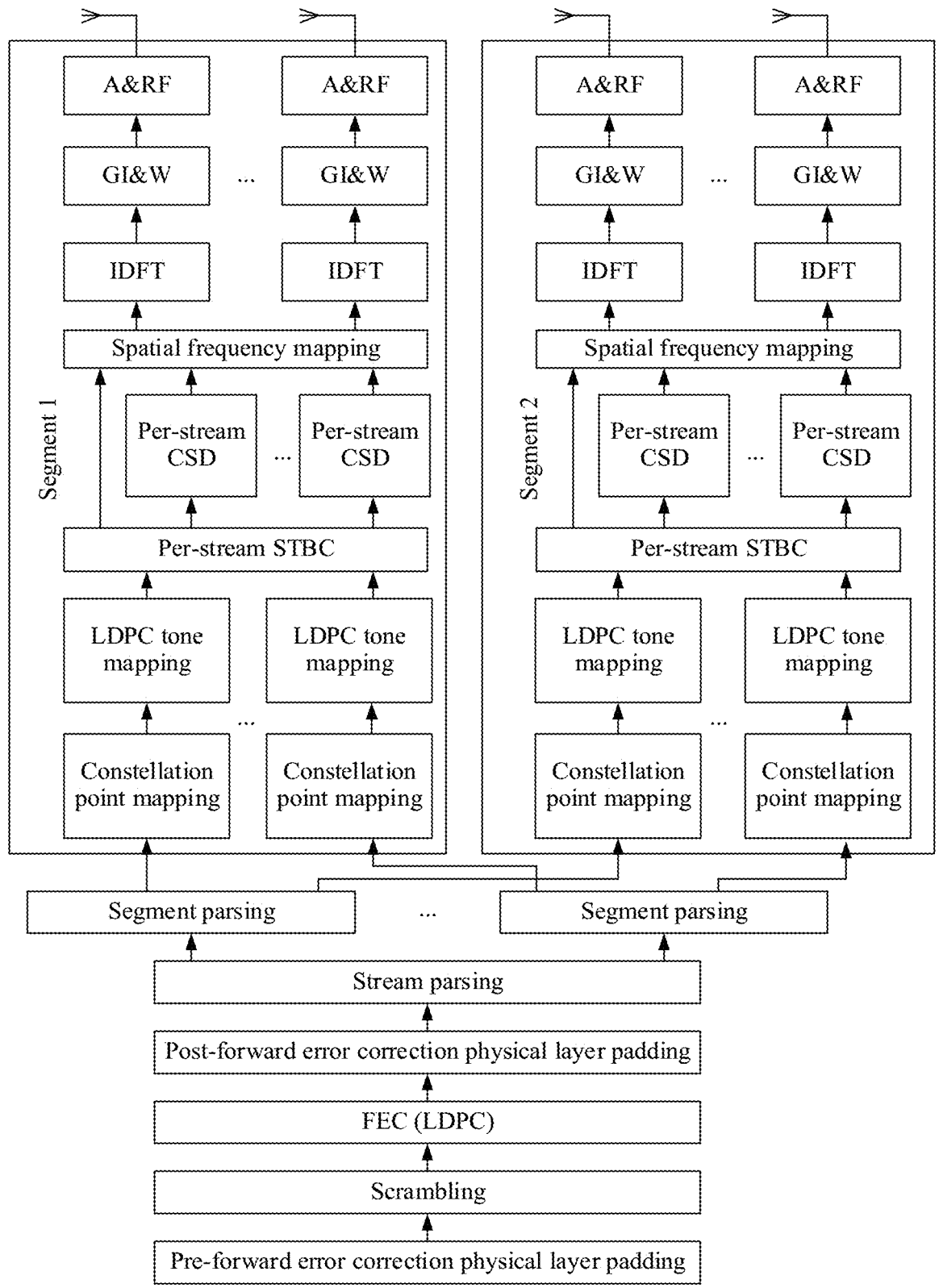
FIG. 4B is a schematic diagram of a transmission procedure of a single station on two discontinuous 80-MHz frequency bands in an existing Wi-Fi system.

In addition, an existing Wi-Fi protocol such as 802.11ax supports a maximum bandwidth of 160 MHz. The 160 MHz may be a continuous 160-MHz bandwidth, or may include two discontinuous 80-MHz frequency bands (that is, 80 MHz+80 MHz). To obtain a diversity gain, the existing Wi-Fi protocol supports 160-MHz transmission in two modes. For example, the existing Wi-Fi protocol proposes a segment parser, configured to distribute coded bits to different 80-MHz segments. FIG. 4A shows a transmission process of a single station at a continuous 160-MHz bandwidth. FIG. 4B shows a transmission process of a single station at 80 MHz+80 MHz.

As shown in FIG. 4A, the transmission process of the single station at the continuous 160-MHz bandwidth mainly includes the following steps: pre-forward error correction physical layer padding (pre-FEC PHY padding), scrambling, forward error correction (FEC) encoding, post-forward error correction physical layer padding (post-FEC PHY padding), stream parsing, segment parsing, constellation point mapping, tone mapping, segment deparsing, per-stream space-time coding, cyclic shift diversity per space-time-stream insertion, spatial frequency mapping, inverse discrete Fourier transform (IDFT), insertion guard interval and windowing (GI&W), and analog and radio frequency (A&RF). The 802.11ax protocol stipulates that a low-density parity-check code (LDPC code) needs to be used as a forward error correction code for a physical layer (PHY) protocol data unit (PPDU) sent in a resource unit greater than 20 MHz. In other words, binary convolutional coding (BCC) is a coding scheme required for any one of resource units RU26, RU52, RU106, or RU242, and LDPC is a coding scheme required for any one of resource units RU484, RU996, or RU996*2. Certainly, in addition to the foregoing required coding schemes, each type of resource unit may have a candidate coding scheme, and details are not described herein.

Compared with the transmission process in FIG. 4A, the transmission process of the single station at 80 MHz+80 MHz in FIG. 4B does not include segment deparsing, because the two 80-MHz frequency bands need to be used for transmission in different radio frequency devices (groups), and coded bits of segments do not need to be combined. Therefore, quantities of analog circuits and radio frequency circuits shown in FIG. 4B each are twofold those in FIG. 4A.

As shown in FIG. 4A and FIG. 4B, the existing Wi-Fi protocol supports transmission of a single station only on two segments having a same frequency band size, and does not incorporate a single-station transmission solution in a scenario in which a quantity of segments is greater than 2 and/or segment sizes are different. As a result, some available spectrum resources may be idle. This is not conducive to improving spectrum resource utilization and a data rate of a Wi-Fi system.

To resolve a problem that the transmission solutions in the foregoing preamble puncturing manners are not applicable to single-station transmission and an uplink direction, and a problem that the foregoing single-station segment parsing and transmission solutions are not applicable to more than two segments and/or different segment sizes, the embodiments of this application provide a coded bit transmission method, including: a method used for a sender for mapping coded bits to a plurality of channel sets used for single-user preamble puncturing transmission or a plurality of resource units used for OFDMA transmission; a method used for a receiver for receiving coded bits from a plurality of channel sets used for single-user preamble puncturing transmission or a plurality of resource units used for OFDMA transmission; and a distribution method for dispersing coded bits to a plurality of segments with different sizes, and a corresponding receiving method. Both the sender and the receiver may be network devices; or both the sender and the receiver may be terminal devices; or one of the sender and the receiver may be a network device, and the other may be a terminal device. This is not limited in the embodiments of this application.

For ease of description, the following describes in detail the coded bit transmission method provided in the embodiments of this application using an example in which a network device is a sender and a terminal device is a receiver.

Figure 5:
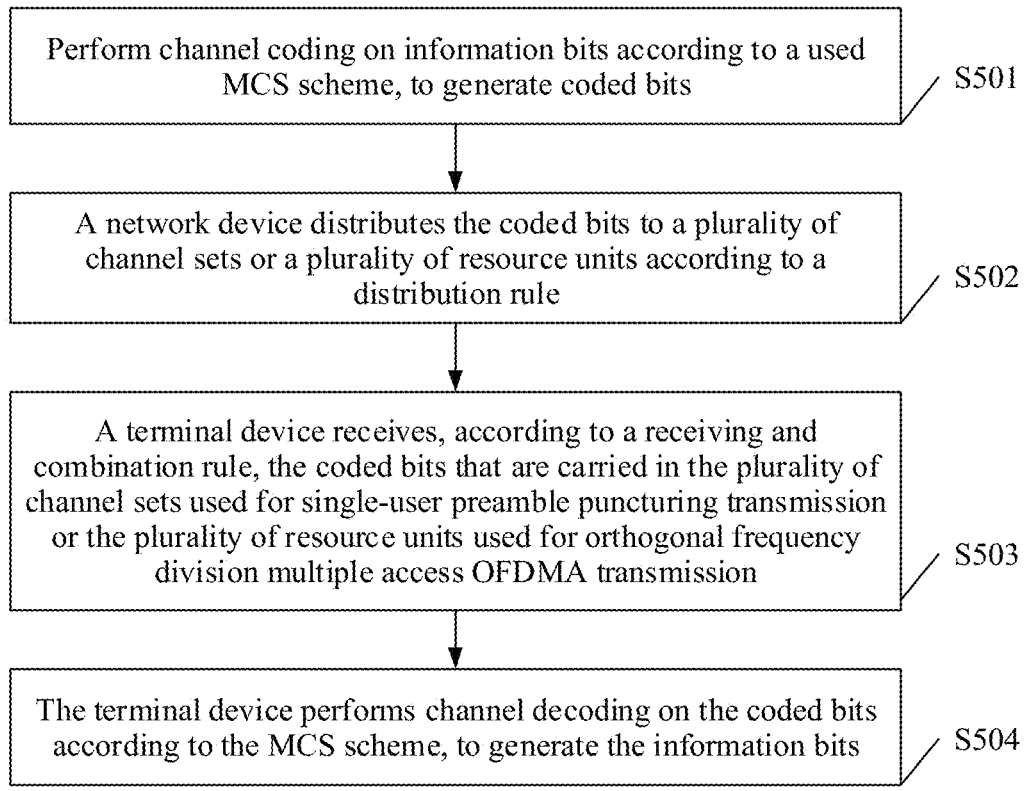
FIG. 5 is a schematic flowchart 1 of a coded bit transmission method according to an embodiment of this application.

As shown in FIG. 5, the method includes S501 to S504.

S501. Perform channel coding on information bits according to a used MCS, to generate coded bits.

The MCS is an MCS used for each of a plurality of channel sets used for single-user preamble puncturing transmission, or an MCS used for each of a plurality of resource units used for OFDMA transmission.

For example, the MCS is usually used to specify a coding scheme and a modulation scheme of a forward error correction code for the sender. The coding scheme is used by the sender to perform channel coding, such as a binary convolutional coding or a low-density parity-check coding, on information bits such as a binary sequence of a voice service and/or a data service. The modulation scheme is mainly used to group a binary sequence obtained through channel coding, that is, coded bits, and perform constellation point mapping on each group of coded bits, to generate a modulated symbol. The modulated symbol may include at least one of the following: binary phase-shift keying (BPSK) and QAM with 4, 8, 16, 64, 128, 256, and 1024 constellation points (4QAM, 8QAM, 16QAM, 64QAM, 128QAM, 256QAM, and 1024QAM, respectively).

Correspondingly, the receiver also needs to specify a decoding scheme corresponding to the coding scheme of the sender and a demodulation scheme corresponding to the modulation scheme of the sender. The demodulation scheme is mainly used by the receiver to demodulate and combine received modulated symbols to recover the coded bits. The decoding scheme is mainly used to perform channel decoding on the recovered coded bits to recover the information bits, thereby completing a receiving procedure of the coded bits. In other words, demodulation and decoding are inverse processes of modulation and coding.

For example, the MCS may be preconfigured on the network device, for example, stored in a configuration file of the network device for invocation, or may be carried in control signaling sent by an upper-layer device of the network device, or may be selected by a transmit end from an MCS set based on a channel condition. This is not limited in this embodiment of this application.

Optionally, the plurality of channel sets may be channel sets including a plurality of channels with at least one of the following bandwidths: 20 MHz, 40 MHz, 80 MHz, 160 MHz, or the like. For example, a preset channel may be a channel with a minimum bandwidth supported by a Wi-Fi system, or may be a channel whose bandwidth is an integer multiple, for example, twofold, fourfold, eightfold, or sixteenfold, of that of the channel with the minimum bandwidth. Each channel set may include one or more preset channels.

It should be noted that, in this embodiment of this application, the channel sets in the plurality of channel sets may be continuous in frequency domain. For example, one channel set may include two continuous 20 MHz. Whether the plurality of channel sets are continuous does not need to be limited in this embodiment of this application.

Resource units in the plurality of resource units may be the following resource units: an RU26, an RU52, an RU106, an RU242, an RU484, an RU996, or an RU996*2, and the resource units may be continuous or discontinuous in frequency domain. The RU26, the RU52, the RU106, the RU242, the RU484, the RU996, and the RU996*2 respectively include 26, 52, 106, 242, 484, 996, and 2*996 tones, and respectively include 24, 48, 102, 234, 468, 980, and 1960 data tones. Maximum resource units corresponding to bandwidths of 20 MHz, 40 MHz, 80 MHz, and 160 MHz are respectively the RU242, the RU484, the RU996, and the RU996*2.

Optionally, for the OFDMA transmission, the plurality of resource units may be allocated to one station or one station set. One station set includes at least two stations, indicating that the plurality of stations perform multi-user (MU) transmission on one resource unit, for example, MU-MIMO. For example, if both resource units A and B are used to carry coded bits of stations 1 and 2, the stations 1 and 2 belong to one station set.

For example, the network device performs channel coding on the information bits according to the coding scheme included in the MCS, to generate the coded bits. Because channel coding belongs to other approaches, details are not described in this embodiment of this application.

Optionally, to reduce operation complexity of performing channel coding on the information bits to generate the coded bits, a same MCS may be used for the plurality of channel sets used for the single-user preamble puncturing transmission, or a same MCS may be used for the plurality of resource units used for the OFDMA transmission. Therefore, if a same MCS is used, the plurality of channel sets or the plurality of resource units may share one encoder (one group of encoders), to reduce system complexity and costs. Certainly, in this application, different MCS may be used for the plurality of channel sets used for the single-user preamble puncturing transmission or the plurality of resource units used for the OFDMA transmission.

S502. The network device distributes the coded bits to the plurality of channel sets or the plurality of resource units according to a distribution rule.

In a possible design method, the distribution rule may include.

A quantity of coded bits distributed by the network device to the plurality of channel sets or the plurality of resource units in a cyclic polling manner meets a first preset relationship. The first preset relationship is used to determine a quantity of coded bits distributed to one channel set or resource unit at a time. For example, the first preset relationship may be as follows:

$$S_i = \max\left(1, \frac{s_i}{2}\right), \quad (1)$$

where $S_i$ is a quantity of coded bits distributed to an $i^{th}$ channel set or an $i^{th}$ resource unit at a time, $s_i$ is a modulation order of constellation point mapping included in an MCS for the $i^{th}$ channel set or the $i^{th}$ resource unit, i≤M, and M is a quantity of the plurality of channel sets or a quantity of the plurality of resource units, for example, a modulation order of constellation point mapping included in 16QAM is 4, that is, four bits are mapped to one OFDMA symbol, where MCSs used for the plurality of channel sets or resource units may be different.

The cyclic polling manner may be round-robin, or may be another cyclic polling manner. This is not limited in this embodiment of this application.

It can be understood that, to reduce interference and obtain an interleaving gain in frequency domain, two adjacent groups of coded bits are usually distributed to different channel sets or resource units.

For example, the first preset relationship may be preconfigured on the network device, for example, stored in a configuration file of the network device for invocation, or may be carried in control signaling sent by an upper-layer device of the network device, or may be selected by a transmit end from an MCS set based on a channel condition. This is not limited in this embodiment of this application.

In another possible design method, the distribution rule may include.

A quantity of coded bits distributed by the network device to the plurality of channel sets or the plurality of resource units in a cyclic polling manner meets a second preset relationship. The second preset relationship is used to determine a quantity of coded bits distributed to one channel set or resource unit at a time. For example, the second preset relationship may be as follows:

$$S_i = N_i \times \max\left(1, \frac{s_i}{2}\right), \quad (2)$$

where $S_i$ is a quantity of coded bits distributed to an $i^{th}$ channel set or an $i^{th}$ resource unit at a time, $s_i$ is a modulation order of constellation point mapping included in an MCS for the $i^{th}$ channel set or the $i^{th}$ resource unit, i≤M, M is a quantity of the plurality of channel sets or a quantity of the plurality of resource units, $N_i$ is a quantity of preset channels included in the $i^{th}$ channel set, or a quantity of preset resource units included in the $i^{th}$ resource unit, and the quantity of preset resource units is a positive integer obtained by rounding off a quotient of a quantity of tones included in the $i^{th}$ resource unit and a quantity of tones included in the preset resource unit, where MCS used for the plurality of channel sets or resource units may be different.

It should be noted that, if a protocol stipulates that a coding scheme used for the plurality of channel sets or the plurality of resource units is LDPC, it may be determined that the modulation order $s_i$ in the formulas (1) and (2) is 1.

In actual application, the quantity $N_i$ of preset resource units may be alternatively determined in another manner. This is not limited in this embodiment of this application.

For example, the quantity $N_i$ of preset resource units may be calculated according to the following formula:

$$N_i = [R_i/R],$$

where $R_i$ is a quantity of tones included in the $i^{th}$ resource unit, R is a quantity of tones included in the preset resource unit, and an operation symbol [ ] indicates rounding.

For another example, the quantity $N_i$ of preset resource units may be alternatively calculated according to the following formula:

$$N_i = \lceil R_i/R \rceil \text{ or } N_i = \lfloor R_i/R \rfloor,$$

where $R_i$ is a quantity of tones included in the $i^{th}$ resource unit, R is a quantity of tones included in the preset resource unit, and operation symbols $\lceil R_i/R \rceil$ and $\lfloor R_i/R \rfloor$ indicate rounding up and rounding down respectively.

It can be understood that two adjacent groups of coded bits are usually distributed to different channel sets or resource units, to reduce simultaneous severe attenuation of data between adjacent tones, obtain an interleaving gain in frequency domain, and reduce a bit error rate.

For example, the preset channel may be a channel with a minimum bandwidth supported by a Wi-Fi system, for example, 20 MHz, or may be a channel whose bandwidth is a common divisor of bandwidths of the plurality of channel sets. For example, there are three channel sets in total, and bandwidths of the three channel sets are 40 MHz, 80 MHz, and 160 MHz. In this case, a bandwidth of the preset channel may be 20 MHz (the minimum bandwidth supported by the Wi-Fi system) or 40 MHz (a maximum common divisor).

In actual application, a channel bandwidth supported by the Wi-Fi system is usually determined as the bandwidth of the preset channel, to reuse an existing channel interleaver to reduce costs and system complexity. For example, an existing BCC interleaver and LDPC tone mapper may be interleavers applicable to resource units with a tone spacing of 78.125 kilohertz (KHz) that are mentioned in IEEE 802.11ax, or may be interleavers applicable to bandwidths 20 MHz, 40 MHz, 80 MHz, and 160 MHz with a tone spacing of 312.5 KHz. For another example, because a bandwidth supported by an existing channel interleaver in the Wi-Fi system does not include 60 MHz, 60 MHz is usually not determined as the bandwidth of the preset channel.

Similar to the preset channel, the preset resource unit may be a minimum resource unit supported by a Wi-Fi system, for example, the RU26 in IEEE 802.11ax, or a minimum resource unit RU52 that may be stipulated in a next-generation protocol, or may be a resource unit including a quantity of tones that is a common divisor of a quantity of tones included in the plurality of resource units. For example, there are three resource units in total: the RU106, the RU242, and the RU484. In this case, the preset resource unit may be the RU106 (a resource unit including a quantity of tones that is a maximum common divisor).

Optionally, to reduce operation complexity of distributing the coded bits to the plurality of channel sets or the plurality of resource units, performing modulation and up-conversion, and sending a radio frequency signal, and improve distribution efficiency, a same MCS may be used for the plurality of channel sets used for the single-user preamble puncturing transmission, or a same MCS may be used for the plurality of resource units used for the OFDMA transmission. Therefore, if a same MCS is used, the plurality of channel sets or the plurality of resource units may share one modulator (one group of modulators), to reduce system complexity and costs.

In another possible design method, the distribution rule may further include:

Distribution of the coded bits is cyclic distribution performed using, as a unit, data carried in a data tone of an OFDM symbol. If at least one of the plurality of channel sets is fully loaded with coded bits distributed to the channel set (data tones included in the channel set are fully loaded), the network device stops distributing coded bits to the at least one of the plurality of channel sets, continues to distribute coded bits to another channel set in the plurality of channel sets according to the distribution rule, and after all the plurality of channel sets are fully loaded with coded bits distributed to the channel sets to form an OFDM symbol, continues to perform a next round of distribution, in order to send coded bits using all spectrum resources in all the channel sets, thereby avoiding idleness of some spectrum resources, and further improving spectrum resource utilization and a data rate.

For example, in a process in which a plurality of channel sets, for example, channel sets 1 to 3, jointly form a first OFDM symbol, if the channel sets 1 and 2 are fully loaded with coded bits but the channel set 3 is not fully loaded, distribution of coded bits to the channel sets 1 and 2 is stopped, coded bits continue to be distributed to the channel set 3, and after all the channel sets 1 to 3 are fully loaded with coded bits to form a complete OFDM symbol, a next round of coded bit distribution is performed to form a next OFDM symbol.

Likewise, in another possible design method, the distribution rule may further include:

If at least one of the plurality of resource units is fully loaded with coded bits distributed to the resource unit (data tones included in the resource unit are fully loaded), the network device stops distributing coded bits to the at least one of the plurality of resource units, continues to distribute coded bits to another resource unit in the plurality of resource units according to the distribution rule, and after all the plurality of resource units are fully loaded with coded bits distributed to the resource units to form an OFDM symbol or a plurality of OFDM symbols are formed on the plurality of resource units, continues to perform a next round of distribution to form a next OFDM symbol, in order to transmit coded bits using all tones in all the resource units, thereby avoiding idleness of some tones, and further improving spectrum resource utilization and a data rate.

For example, in a process in which a plurality of resource units, for example, resource units 1 to 3, jointly form a first OFDM symbol, if the resource units 1 and 3 are fully loaded with coded bits but the resource unit 2 is not fully loaded, distribution of coded bits to the resource units 1 and 3 is stopped, coded bits continue to be distributed to the resource unit 2, and after all the resource units 1 to 3 are fully loaded with coded bits to form a complete OFDM symbol, a next round of coded bit distribution is performed to form a next OFDM symbol.

The following describes in detail, using several examples, how a channel parser distributes coded bits to a plurality of channel sets.

FIG. 6A to FIG. 6H each are a schematic diagram of a coded bit distribution manner in a scenario with a plurality of channel sets. All distribution actions are performed by a channel parser.

Distribution manner 1 is as follows.

Figure 6A:
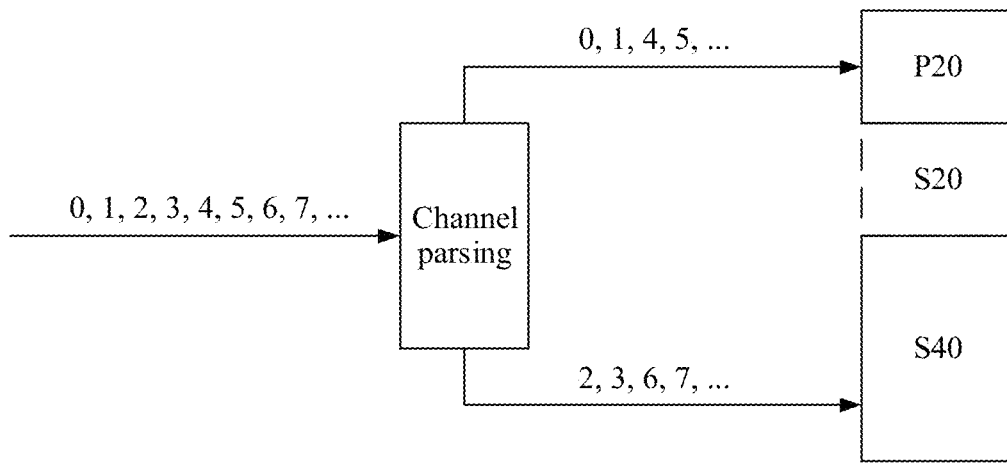
FIG. 6A is a schematic diagram 1 of a distribution manner of distributing coded bits to a plurality of channel sets according to an embodiment of this application.

For example, FIG. 3A shows a puncturing pattern (S20 is punctured, and S40 is not punctured) of a puncturing manner 1 for an 80-MHz bandwidth. In this case, the plurality of channel sets include two channel sets: P20 and the S40. Assuming that modulation orders of constellation point mapping included in MCS for the two channel sets are both 4, as shown in FIG. 6A, S502 may be implemented as the following steps.

Step 1: Calculate, according to the formula (1), a quantity of coded bits distributed to the P20 and the S40 each time, where the quantity is 2.

Step 2: In each round of distribution, successively distribute two coded bits to each of the P20 and the S40.

For example, in a first round, coded bits 0 and 1 are distributed to the P20, and coded bits 2 and 3 are distributed to the S40; in a second round, coded bits 4 and 5 are distributed to the P20, and coded bits 6 and 7 are distributed to the S40.

Step 3: Cyclically perform step 2 until the P20 that includes fewer data tones is fully loaded first.

Because a quantity of data tones included in the S40 is twofold that of the P20, after the P20 is fully loaded, the following step further needs to be performed.

Step 4: Stop distributing coded bits to the P20, and continue to distribute coded bits to the S40 until the S40 is also fully loaded, in order to transmit coded bits using all data tones included in the S40, thereby avoiding a waste of resources, and performing interleaving within each channel set.

It should be noted that, although the quantity of data tones included in the S40 is twofold that of the P20, if a modulation order of the S40 is also twofold that of the P20, the P20 and the S40 are also fully loaded simultaneously. For example, a modulation order of the P20 is 2, and a modulation order of the S40 is 4.

Distribution manner 2 is as follows.

Figure 6B:
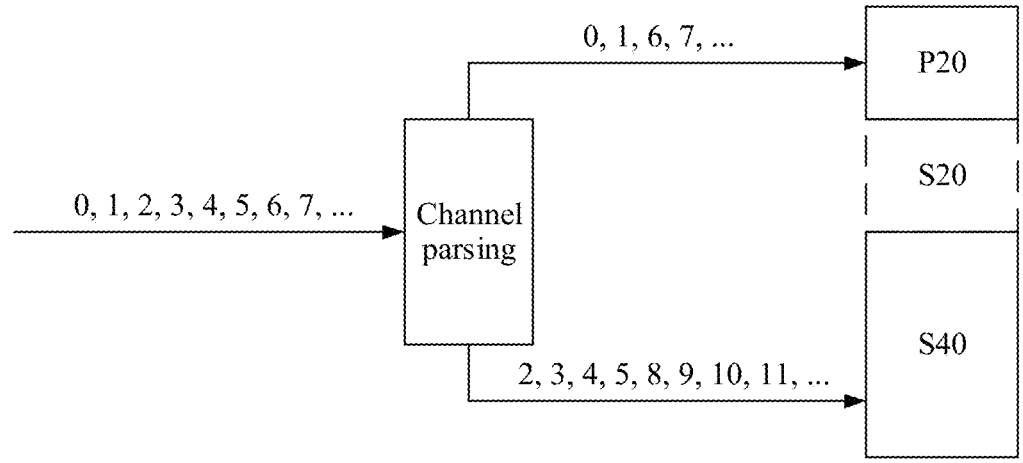
FIG. 6B is a schematic diagram 2 of a distribution manner of distributing coded bits to a plurality of channel sets according to an embodiment of this application.

A channel set, a puncturing pattern, and a modulation order are all the same as those in the distribution manner 1. Assuming that a preset channel is a 20-MHz channel, as shown in FIG. 6B, S502 may be implemented as the following steps.

Step 1: Calculate, according to the formula (2), a quantity of coded bits distributed to the P20 each time, where the quantity is 2, and a quantity of coded bits distributed to the S40 each time, where the quantity is 4.

Step 2: In each round of distribution, distribute two coded bits to the P20, and distribute four coded bits to the S40.

For example, in a first round, coded bits 0 and 1 are distributed to the P20, and coded bits 2 to 5 are distributed to the S40; in a second round, coded bits 6 and 7 are distributed to the P20, and coded bits 8, 9, 10, and 11 are distributed to the S40.

Step 3: Cyclically perform step 2 until the P20 and the S40 are fully loaded simultaneously.

Distribution manner 3 is as follows.

Figure 6C:
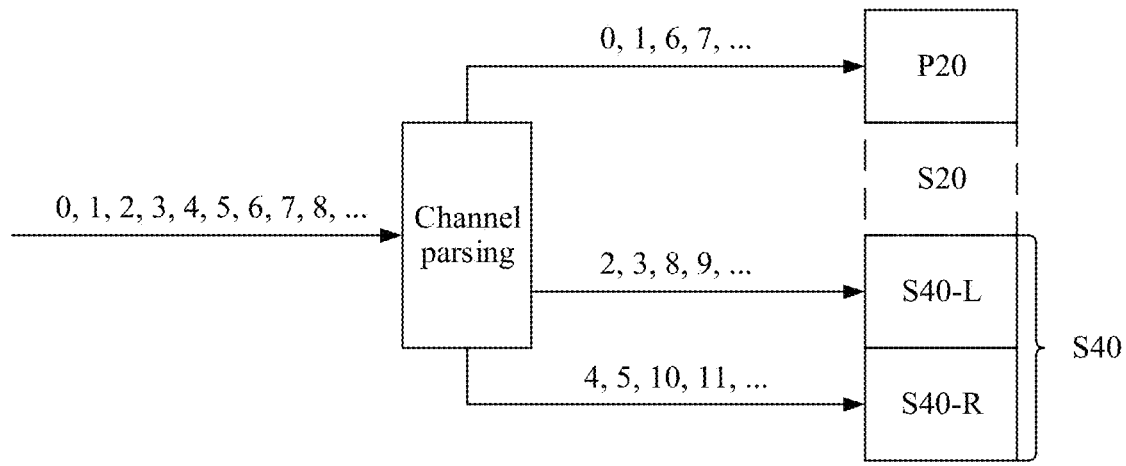
FIG. 6C is a schematic diagram 3 of a distribution manner of distributing coded bits to a plurality of channel sets according to an embodiment of this application.

A channel set, a puncturing pattern, and a modulation order are all the same as those in the distribution manner 1. Because the S40 in the example described in the distribution manner 2 includes two channels (S40-L and S40-R) with a bandwidth of 20 MHz, coded bits may be alternatively distributed using, as a unit, the minimum bandwidth that can be supported by Wi-Fi, that is, the bandwidth of 20 MHz. Therefore, as shown in FIG. 6C, S502 may be implemented as the following steps.

Step 1: Calculate, according to the formula (1), a quantity of coded bits distributed to the P20, the S40-L, and the S40-R each time, where the quantity is 2.

Step 2: In each round of distribution, successively distribute two coded bits to each of the P20, the S40-L, and the S40-R.

For example, in a first round, coded bits 0 and 1 are distributed to the P20, coded bits 2 and 3 are distributed to the S40-L, and coded bits 4 and 5 are distributed to the S40-R; in a second round, coded bits 6 and 7 are distributed to the P20, coded bits 8 and 9 are distributed to the S40-L, and coded bits 10 and 11 are distributed to the S40-R.

Step 3: Cyclically perform step 2 until the P20, the S40-L, and the S40-R are fully loaded simultaneously.

Distribution manner 4 is as follows.

Figure 6D:
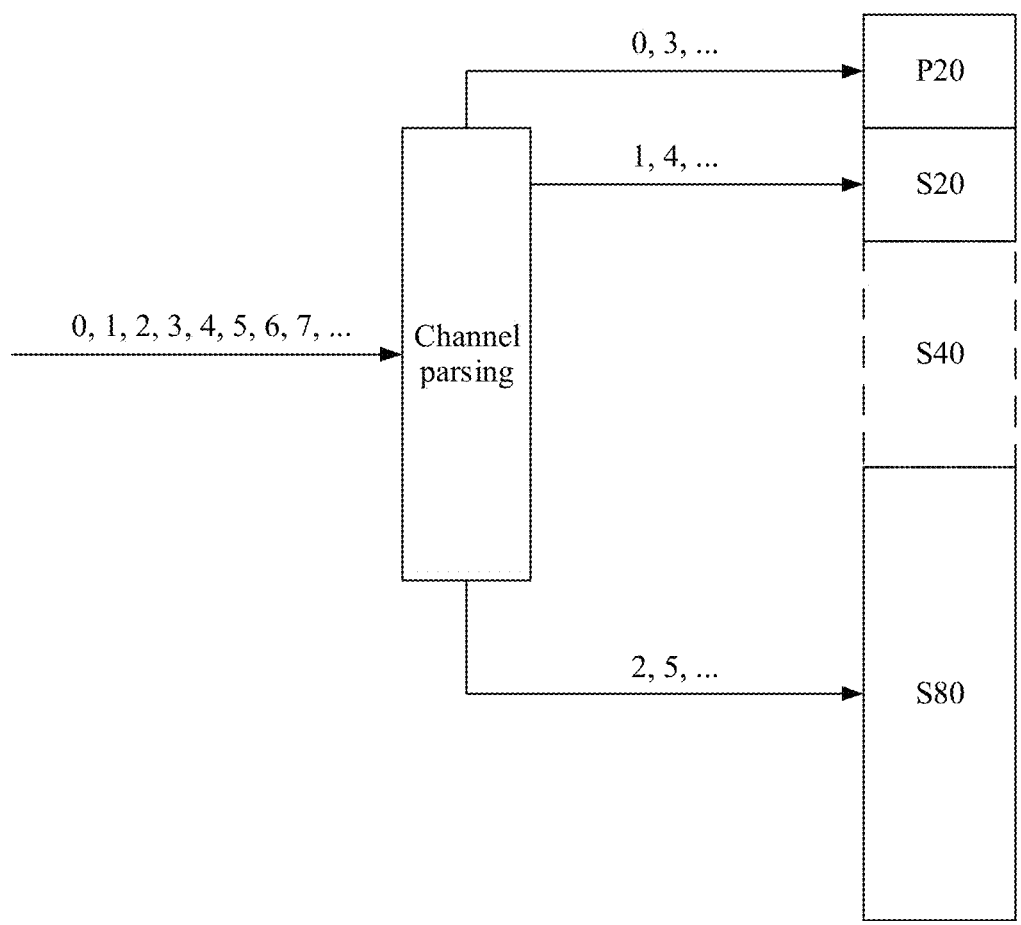
FIG. 6D is a schematic diagram 4 of a distribution manner of distributing coded bits to a plurality of channel sets according to an embodiment of this application.

For example, FIG. 3D shows a puncturing pattern 3 (S40 is punctured, and S80 is not punctured) of a puncturing manner 2 for a 160-MHz bandwidth. Assuming that the S80 is not punctured, the plurality of channel sets include three channel sets: P20, S20, and the S80. Assuming that modulation orders of constellation point mapping included in MCS for the three channel sets are both 2, for example, a modulation scheme is BPSK, as shown in FIG. 6D, S502 may be implemented as the following steps.

Step 1: Calculate, according to the formula (1), a quantity of coded bits distributed to the P20, the S20, and the S80 each time, where the quantity is 1.

Step 2: In each round of distribution, successively distribute one coded bit to each of the P20, the S20, and the S80.

For example, in a first round, a coded bit 0 is distributed to the P20, a coded bit 1 is distributed to the S20, and a coded bit 2 is distributed to the S80; in a second round, a coded bit 3 is distributed to the P20, a coded bit 4 is distributed to the S20, and a coded bit 5 is distributed to the S80.

Step 3: Cyclically perform step 2 until the P20 and the S20 are fully loaded first simultaneously but the S80 has not been fully loaded.

Because a quantity of data tones included in the S80 is more than fourfold that of the P20 and the S20, after the P20 and the S20 are fully loaded, the following step further needs to be performed.

Step 4: Stop distributing coded bits to the P20 and the S20, and continue to distribute coded bits to the S80 until the S80 is also fully loaded, in order to transmit coded bits using all bandwidths of the S80, thereby avoiding a waste, and performing interleaving within a channel set.

Distribution manner 5 is as follows.

Figure 6E:
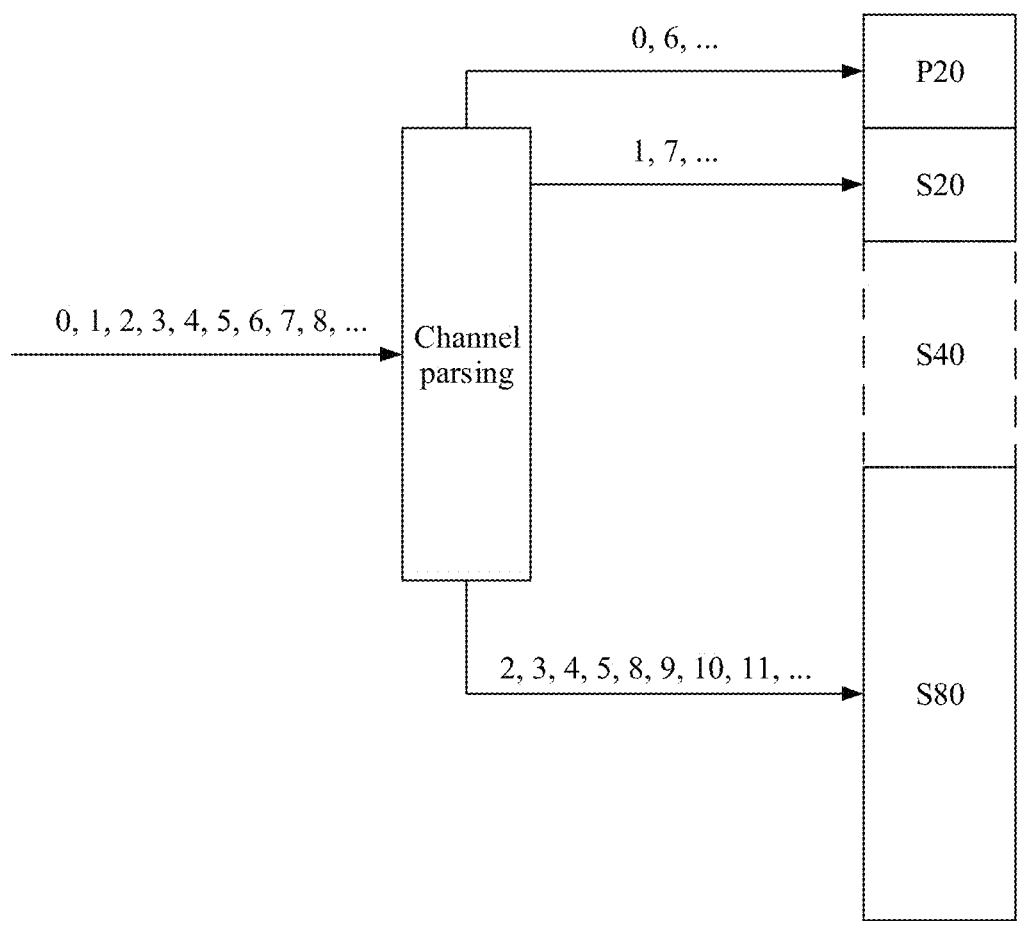
FIG. 6E is a schematic diagram 5 of a distribution manner of distributing coded bits to a plurality of channel sets according to an embodiment of this application.

A channel set, a puncturing pattern, and a modulation order are all the same as those in the distribution manner 4. Assuming that a preset channel is a channel with a bandwidth of 20 MHz, as shown in FIG. 6E, S502 may be implemented as the following steps.

Step 1: Calculate, according to the formula (2), quantities of coded bits distributed to the P20, the S20, and the S80 each time, where the quantities are 1, 1, and 4 respectively.

Step 2: In each round of distribution, successively distribute one coded bit, one coded bit, and four coded bits to the P20, the S20, and the S80 respectively.

For example, in a first round, a coded bit 0 is distributed to the P20, a coded bit 1 is distributed to the S20, and coded bits 2 to 5 are distributed to the S80; in a second round, a coded bit 6 is distributed to the P20, a coded bit 7 is distributed to the S20, and coded bits 8 to 11 are distributed to the S80.

Step 3: Cyclically perform step 2 until the P20 and the S20 are fully loaded first simultaneously but the S80 has not been fully loaded.

Because a quantity of data tones included in the S80 is more than fourfold that of the P20 and the S20, after the P20 and the S20 are fully loaded, the following step further needs to be performed.

Step 4: Stop distributing coded bits to the P20 and the S20, and continue to distribute coded bits to the S80 until the S80 is also fully loaded, in order to transmit coded bits using all bandwidths of the S80, thereby avoiding a waste, and performing interleaving within a channel set.

Distribution manner 6 is as follows.

Figure 6F:
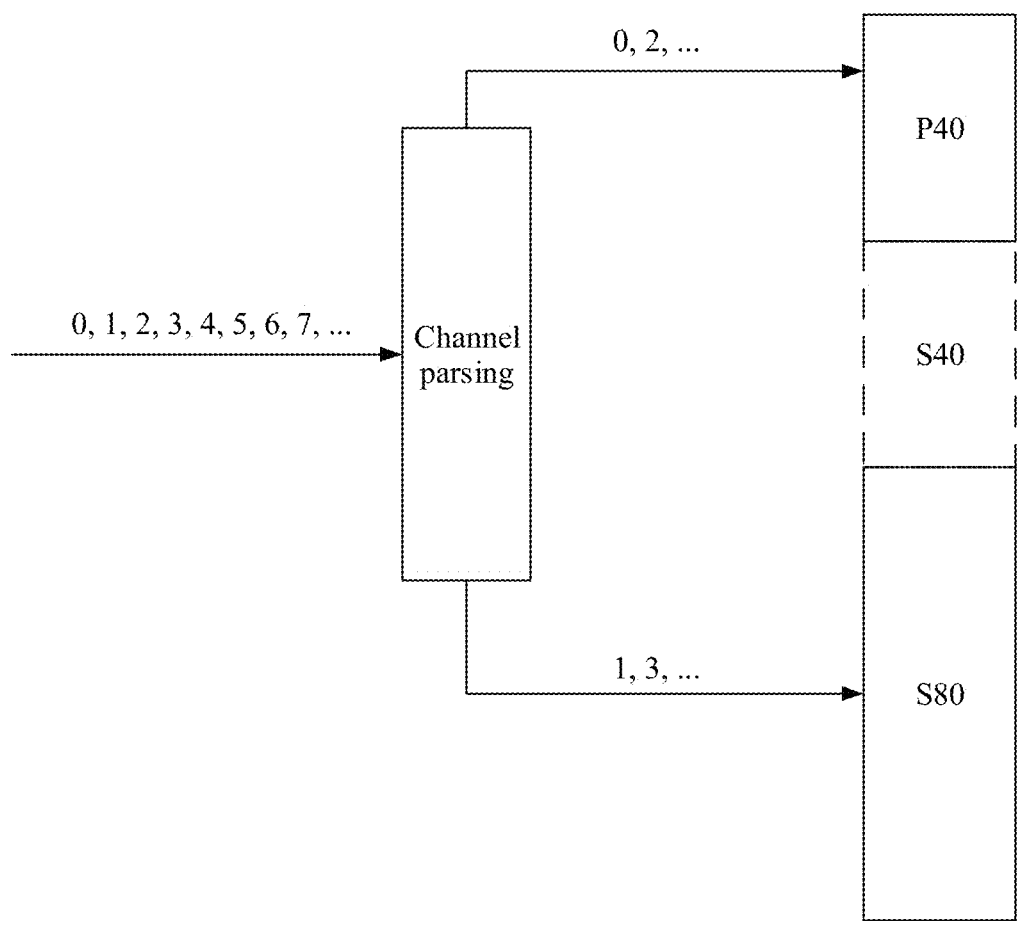
FIG. 6F is a schematic diagram 6 of a distribution manner of distributing coded bits to a plurality of channel sets according to an embodiment of this application.

A puncturing pattern and a modulation order are both the same as those in the distribution manner 4. Because the channel sets P20 and S20 in the distribution manner 4 are continuous, according to a continuous channel aggregation rule, the P20 and the S20 may be aggregated into one channel (P40) for use, that is, it may be considered that, in the distribution manner 6, there are two channel sets in total: the P40 and S80. In this case, as shown in FIG. 6F, S502 may be implemented as the following steps.

Step 1: Calculate, according to the formula (1), a quantity of coded bits distributed to the P40 and the S80 each time, where the quantity is 1.

Step 2: In each round of distribution, successively distribute one coded bit to each of the P40 and the S80.

For example, in a first round, a coded bit 0 is distributed to the P40, and a coded bit 1 is distributed to the S80; in a second round, a coded bit 2 is distributed to the P40, and a coded bit 3 is distributed to the S80.

Step 3: Cyclically perform step 2 until the P40 is fully loaded first but the S80 has not been fully loaded.

Because a quantity of data tones included in the S80 is more than twofold that of the P40, after the P40 is fully loaded, the following step further needs to be performed.

Step 4: Stop distributing coded bits to the P40, and continue to distribute coded bits to the S80 until the S80 is also fully loaded, in order to transmit coded bits using all bandwidths of the S80, thereby avoiding a waste, and performing interleaving within a channel set.

Distribution manner 7 is as follows.

Figure 6G:
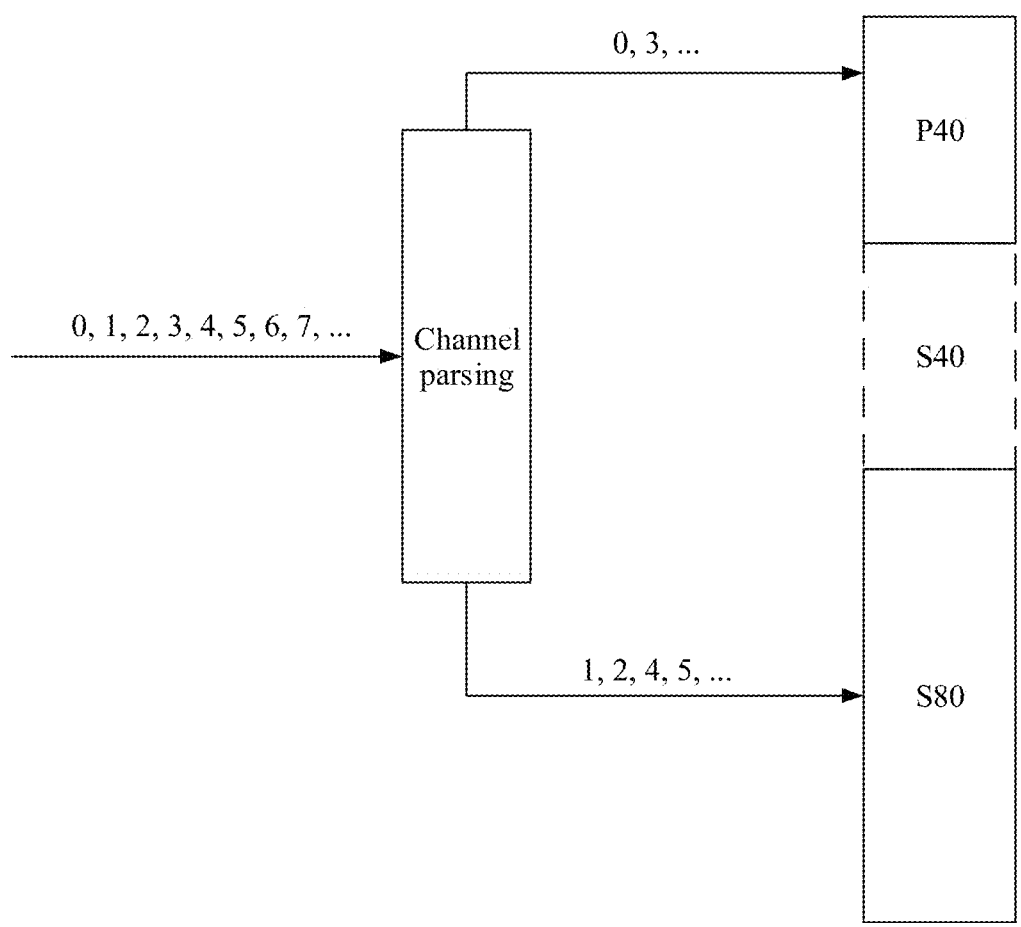
FIG. 6G is a schematic diagram 7 of a distribution manner of distributing coded bits to a plurality of channel sets according to an embodiment of this application.

A channel set, a puncturing pattern, and a modulation order are all the same as those in the distribution manner 6. Assuming that a bandwidth of a preset channel is a maximum common divisor of bandwidths of the two channel sets, that is, 40 MHz, as shown in FIG. 6G, S502 may be implemented as the following steps.

Step 1: Calculate, according to the formula (2), quantities of coded bits distributed to the P40 and the S80 each time, where the quantities are 1 and 2 respectively.

Step 2: In each round of distribution, successively distribute one coded bit to the P40, and distribute two coded bits to the S80.

For example, in a first round, a coded bit 0 is distributed to the P40, and coded bits 1 and 2 are distributed to the S80; in a second round, a coded bit 3 is distributed to the P40, and coded bits 4 and 5 are distributed to the S80.

Step 3: Cyclically perform step 2 until the P40 is fully loaded first but the S80 has not been fully loaded.

Because a quantity of data tones included in the S80 is more than twofold that of the P40, after the P40 is fully loaded, the following step further needs to be performed.

Step 4: Stop distributing coded bits to the P40, and continue to distribute coded bits to the S80 until the S80 is also fully loaded, in order to transmit coded bits using all bandwidths of the S80, thereby avoiding a waste, and performing interleaving within a channel set.

Distribution manner 8 is as follows.

Figure 6H:
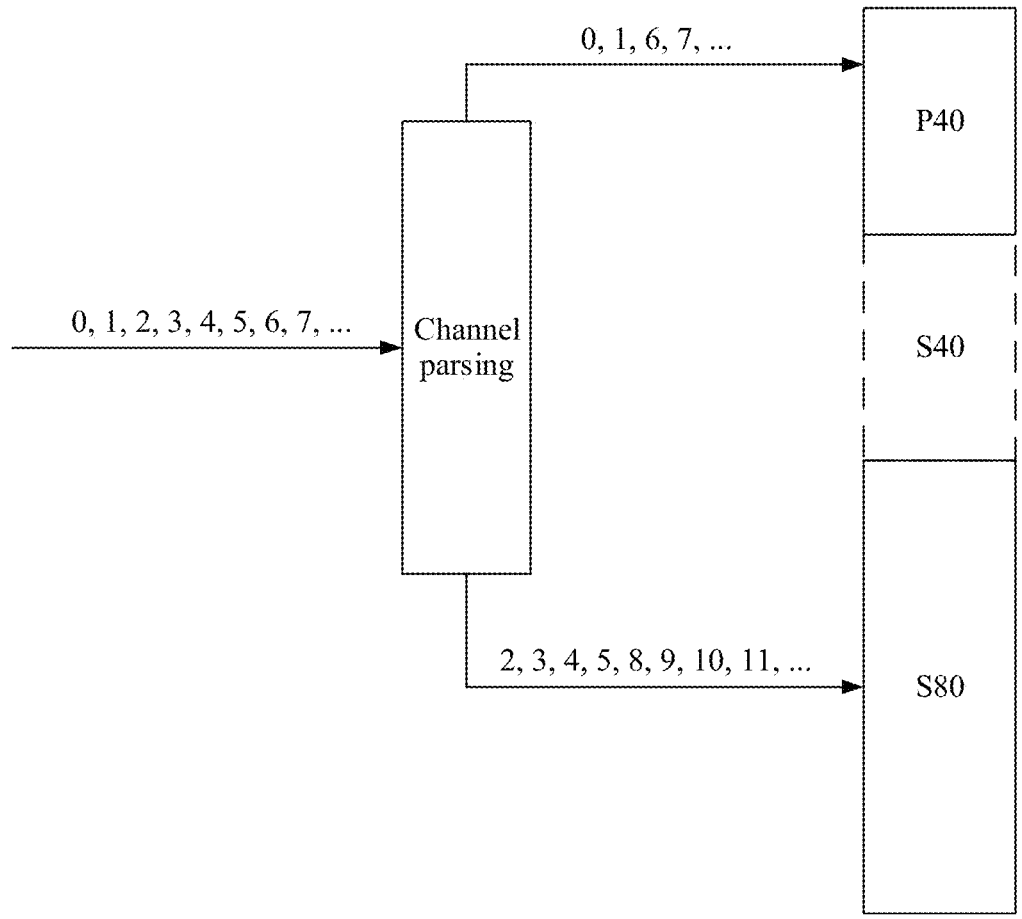
FIG. 6H is a schematic diagram 8 of a distribution manner of distributing coded bits to a plurality of channel sets according to an embodiment of this application.

A channel set, a puncturing pattern, and a modulation order are all the same as those in the distribution manner 6. Assuming that a preset channel is a minimum channel that can be supported by a Wi-Fi system: a 20-MHz channel, as shown in FIG. 6H, S502 may be implemented as the following steps.

Step 1: Calculate, according to the formula (2), a quantity of coded bits distributed to the P40 each time, where the quantity is 2, and a quantity of coded bits distributed to the S80 each time, where the quantity is 4.

Step 2: In each round of distribution, distribute two coded bits to the P40, and distribute four coded bits to the S80.

For example, in a first round, coded bits 0 and 1 are distributed to the P40, and coded bits 2 to 5 are distributed to the S80; in a second round, coded bits 6 and 7 are distributed to the P40, and coded bits 8 to 11 are distributed to the S80.

Step 3: Cyclically perform step 2 until the P40 is fully loaded first but the S80 has not been fully loaded.

Because a quantity of data tones included in the S80 is more than twofold that of the P40, after the P40 is fully loaded, the following step further needs to be performed.

Step 4: Stop distributing coded bits to the P40, and continue to distribute coded bits to the S80 until the S80 is also fully loaded, in order to transmit coded bits using all bandwidths of the S80, thereby avoiding a waste, and performing interleaving within a channel set.

For ease of reading, Table 1 in FIG. 14 provides summary information of the foregoing distribution manners 1 to 8.

It should be noted that whether some channels are fully loaded first is related to the following plurality of factors: a channel bandwidth, a formula used for calculating a quantity of coded bits distributed each time, a preset channel bandwidth, a modulation order, and the like. In the foregoing distribution manners, an example in which some channels are fully loaded first is an example in which a channel with a lower bandwidth is fully loaded first. In actual application, alternatively, a channel with a higher bandwidth may be fully loaded first. For example, for the distribution manner 2, if modulation orders of the P20 and the S40 are 6 and 2 respectively, it can be learned according to the formula (2) that quantities of coded bits distributed to the P20 and the S40 each time are 3 and 1 respectively. As a result, the S40 is fully loaded first, and the P20 is fully loaded later.

In addition, in the foregoing distribution manners 1 to 8, for each distribution manner, a modulation order for each channel and a formula for calculating a quantity of coded bits distributed each time are the same, and for distribution manners in which the same formula (1) or (2) is used, a preset channel bandwidth of each channel is also the same. In actual application, a modulation order, a formula for calculating a quantity of coded bits distributed each time, and a preset channel bandwidth may be separately selected for each channel. This is not limited in this embodiment of this application.

In another possible design method, a continuous 20-MHz channel set may be divided based on a resource unit or a bandwidth to which an existing interleaver (including a BCC interleaver and an LDPC tone mapper) is applicable. Currently, existing interleavers include: an interleaver applicable to a 242-tone resource unit corresponding to 20 MHz, an interleaver applicable to a 484-tone resource unit corresponding to 40 MHz, an interleaver applicable to a 996-tone resource unit corresponding to 80 MHz, an interleaver applicable to a 2*996-tone resource unit corresponding to 160 MHz, and an interleaver applicable to a resource unit corresponding to 320 MHz that may be added to a next-generation Wi-Fi protocol. Using the puncturing pattern shown in FIG. 3A as an example, based on the 80-MHz preamble puncturing transmission mode and according to the continuous channel aggregation rule, the punctured 80-MHz bandwidth may be separately aggregated into the P20 and the S40.

The following formula is defined:

$$s = \max\left\{1, \frac{N_{BPSCS}}{2}\right\},$$

where $N_{BPSCS}$ is a modulation order, namely, $s_i$, in the formula (2), that is, a quantity of coded bits carried in each OFDM tone. It is assumed that $x_k^{P20}$ is an output of the channel parser for the P20 channel, $x_k^{S40}$ is an output of the channel parser for the S40 channel, $y_i$ is an input of the channel parser, $n_{20}$ is a quantity of 20-MHz channels, and $n_{40}$ is a quantity of 40-MHz channels. For the channel parser, $n_{20}=n_{40}=1$. In this case, coded bits distributed to each channel are shown in the following formulas.

1. Input of the P20 channel:

$$x_k^{P20} = y_i, \; i = s \cdot (n_{20} + 2n_{40}) \cdot \left\lfloor \frac{k}{s} \right\rfloor + k \bmod s,$$

where k=0, K, $N_{CBPSS\_P20}$.

2. Input of the S40 channel:

$$x_k^{S40} = y_i, \; i = s \cdot n_{20} + s \cdot (n_{20} + 2n_{40}) \cdot \left\lfloor \frac{k}{2s} \right\rfloor + k \bmod 2s,$$

where k=0,1K, $N_{CBPSS\_S40}$.

For another example, using the puncturing pattern 1 shown in FIG. 3B as an example, based on the 80-MHz preamble puncturing transmission mode and according to the continuous channel aggregation rule, the punctured 80-MHz bandwidth may be separately aggregated into the P40 and the S40-L. Certainly, the puncturing pattern 2 shown in FIG. 3B may be alternatively used as an example. Based on the 80-MHz preamble puncturing transmission mode and according to the continuous channel aggregation rule, the punctured 80-MHz bandwidth may be separately aggregated into the P40 and the S40-R.

In a case of P40+S40-L or P40+S40-R, it is assumed that $x_k^{P40}$ is an output of the channel parser for the P40 channel, $x_k^{S40\_Half}$ is an output of the channel parser for the S40-L or S40-R channel, $y_i$ is an input of the channel parser, $n_{20}$ is a quantity of 20-MHz channels, and $n_{40}$ is a quantity of 40-MHz channels. For the channel parser, $n_{40}=n_{20}=1$. Corresponding formulas are as follows.

1. Input of the P40 channel:

$$x_k^{P40} = y_i, \; i = s \cdot (n_{20} + 2n_{40}) \cdot \left\lfloor \frac{k}{2s} \right\rfloor + k \bmod 2s,$$

where k=0, 1K, $N_{CBPSS\_P40}$.

2. Input of the S40-L or S40-R channel:

$$x_k^{S40\_Half} = y_i, \; i = 2s \cdot n_{40} + s \cdot (n_{20} + 2n_{40}) \cdot \left\lfloor \frac{k}{s} \right\rfloor + k \bmod s,$$

where k=0,1K, $N_{CBPSS\_S40\_Half}$.

For still another example, in a case of P20+S20+S40-L or P20+S20+S40-R, it is assumed that $x_k^{P20}$ is an output of the channel parser for the P20 channel, $x_k^{S20}$ is an output of the channel parser for the S20 channel, $x_k^{S40\_Half}$ is an output of the channel parser for the S40-L or S40-R channel, $y_i$ is an input of the channel parser, $n_{20}$ is a quantity of 20-MHz channels, and $n_{40}$ is a quantity of 40-MHz channels. For the channel parser, $n_{40}=0$, and $n_{20}=3$. Corresponding formulas are as follows.

1. Input of the P20 channel:

$$x_k^{P20} = y_i, \; i = s \cdot (n_{20} + 2n_{40}) \cdot \left\lfloor \frac{k}{s} \right\rfloor + k \bmod s,$$

where k=0,1K, $N_{CBPSS\_P20}$.

2. Input of the S20 channel:

$$x_k^{S20} = y_i, \; i = s + s \cdot (n_{20} + 2n_{40}) \cdot \left\lfloor \frac{k}{s} \right\rfloor + k \bmod s,$$

where k=0,1K, $N_{CBPSS\_S20}$.

3. Input of the S40-L or S40-R channel:

$$x_k^{S40\_Half} = y_i, \; i = 2s + s \cdot (n_{20} + 2n_{40}) \cdot \left\lfloor \frac{k}{s} \right\rfloor + k \bmod s,$$

where k=0,1,K, $N_{CBPSS\_S40\_Half}$.

Figure 7A:
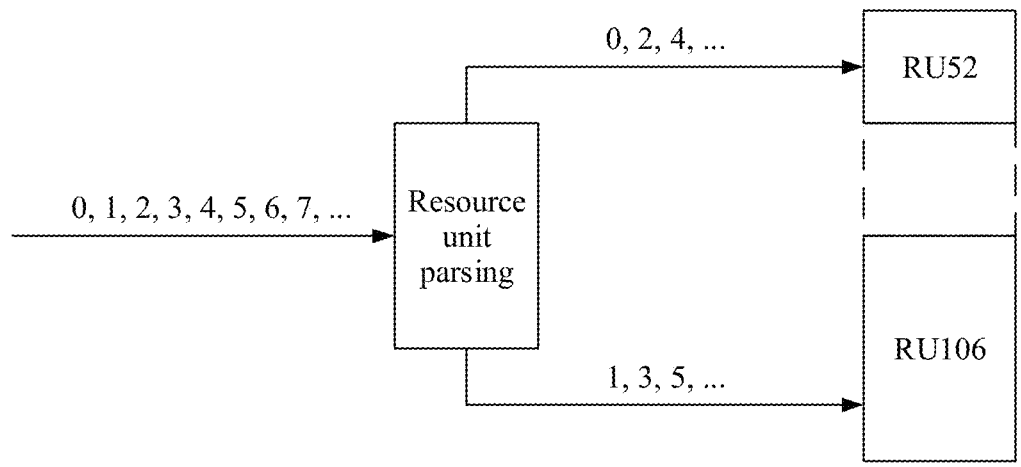
FIG. 7A is a schematic diagram 1 of a distribution manner of distributing coded bits to a plurality of resource units according to an embodiment of this application.
Figure 7B:
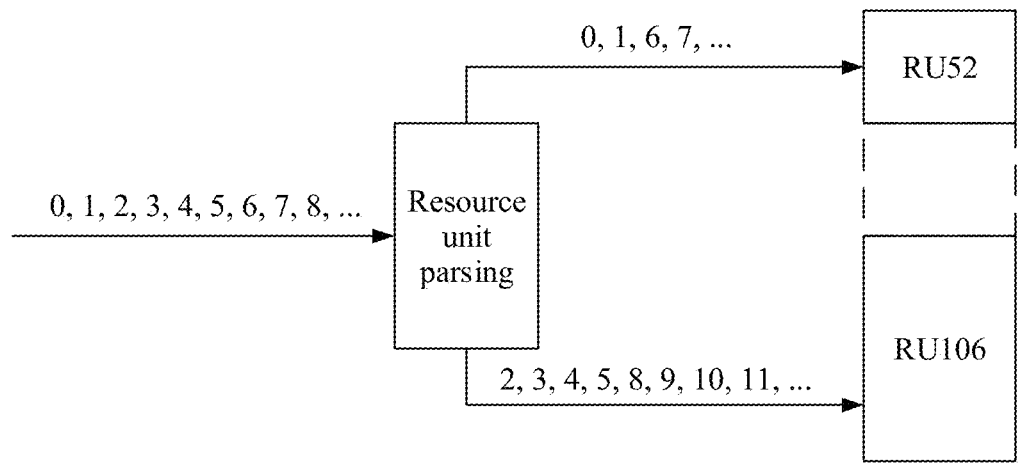
FIG. 7B is a schematic diagram 2 of a distribution manner of distributing coded bits to a plurality of resource units according to an embodiment of this application.
Figure 7C:
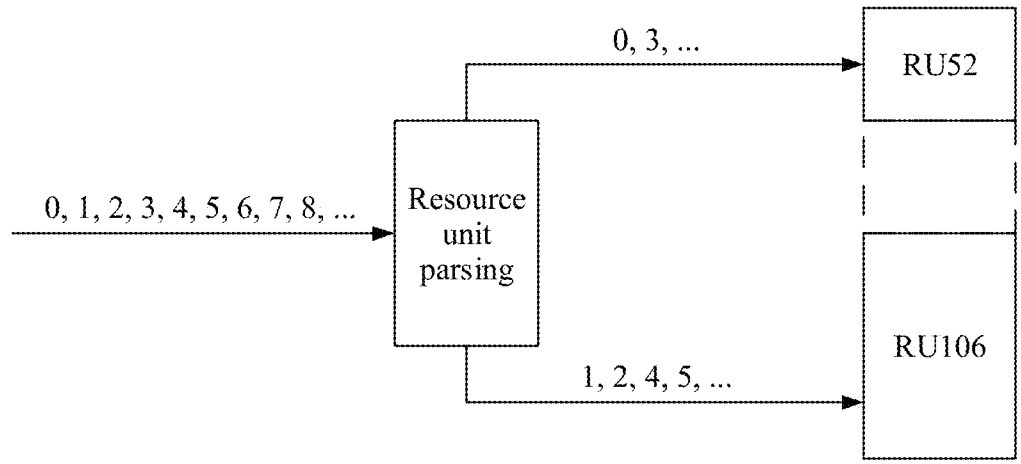
FIG. 7C is a schematic diagram 3 of a distribution manner of distributing coded bits to a plurality of resource units according to an embodiment of this application.

FIG. 7A to FIG. 7C each are a schematic diagram of a method for distributing coded bits to a plurality of resource units by a resource unit parser. All distribution actions are performed by the resource unit parser.

Distribution manner 1 is as follows.

As shown in FIG. 7A, the plurality of resource units include an RU52 and an RU106. Assuming that modulation orders of the RU52 and the RU106 are both 2, S502 may be implemented as the following steps.

Step 1: Calculate, according to the formula (1), a quantity of coded bits distributed to the RU52 and the RU106 each time, where the quantity is 1.

Step 2: In each round of distribution, successively distribute one coded bit to each of the RU52 and the RU106.

For example, in a first round, a coded bit 0 is distributed to the RU52, and a coded bit 1 is distributed to the RU106; in a second round, a coded bit 2 is distributed to the RU52, and a coded bit 3 is distributed to the RU106.

Step 3: Cyclically perform step 2 until the RU52 is fully loaded first but the RU106 has not been fully loaded.

Because a quantity of data tones included in the RU106 is more than twofold that of the RU52, after the RU52 is fully loaded, the following step further needs to be performed.

Step 4: Stop distributing coded bits to the RU52, and continue to distribute coded bits to the RU106 until the RU106 is also fully loaded, in order to transmit coded bits using all data tones included in the RU106, thereby avoiding a waste.

Distribution manner 2 is as follows.

As shown in FIG. 7B, the plurality of resource units and a modulation order are both the same as those in the distribution manner 1 shown in FIG. 7A. Assuming that a preset resource unit is a smaller resource unit RU52 in the two resource units, S502 may be implemented as the following steps.

Step 1: Calculate, according to the formula (2), quantities of coded bits distributed to the RU52 and the RU106 each time, where the quantities are 1 and 2 respectively.

Step 2: In each round of distribution, successively distribute one coded bit to the RU52, and distribute two coded bits to the RU106.

For example, in a first round, a coded bit 0 is distributed to the RU52, and coded bits 1 and 2 are distributed to the RU106; in a second round, a coded bit 3 is distributed to the RU52, and coded bits 4 and 5 are distributed to the RU106.

Step 3: Cyclically perform step 2 until the RU52 is fully loaded first but the RU106 has not been fully loaded.

Because a quantity of data tones included in the RU106 is more than twofold that of the RU52, after the RU52 is fully loaded, the following step further needs to be performed.

Step 4: Stop distributing coded bits to the RU52, and continue to distribute coded bits to the RU106 until the RU106 is also fully loaded, in order to transmit coded bits using all data tones included in the RU106, thereby avoiding a waste.

Distribution manner 3 is as follows.

As shown in FIG. 7C, the plurality of resource units and a modulation order are both the same as those in the distribution manner shown in FIG. 7A. Assuming that a preset resource unit is a minimum resource unit RU26 that can be supported by a Wi-Fi system, S502 may be implemented as the following steps.

Step 1: Calculate, according to the formula (2), a quantity of coded bits distributed to the RU52 each time, where the quantity is 2, and a quantity of coded bits distributed to the RU106 each time, where the quantity is 4.

Step 2: In each round of distribution, distribute two coded bits to the RU52, and distribute four coded bits to the RU106.

For example, in a first round, coded bits 0 and 1 are distributed to the RU52, and coded bits 2 to 5 are distributed to the RU106; in a second round, coded bits 6 and 7 are distributed to the RU52, and coded bits 8 to 11 are distributed to the RU106.

Step 3: Cyclically perform step 2 until the RU52 is fully loaded first but the RU106 has not been fully loaded.

Because a quantity of data tones included in the RU106 is more than twofold that of the RU52, after the RU52 is fully loaded, the following step further needs to be performed.

Step 4: Stop distributing coded bits to the RU52, and continue to distribute coded bits to the RU106 until the RU106 is also fully loaded, in order to transmit coded bits using all data tones included in the RU106, thereby avoiding a waste.

Table 2 shows summary information of several distribution manners of distributing coded bits to each resource unit by the resource unit parser.

channel set by the channel parser. Details are not described again in this embodiment of this application.

Optionally, if there are a plurality of streams and there are no plurality of segments, the channel parser or the resource unit parser that distributes the coded bits is located after a stream parser; or if there are a plurality of segments, the channel parser or the resource unit parser that distributes the coded bits is located after a segment parser; or if there are both a plurality of streams and a plurality of segments, the channel parser or the resource unit parser that distributes the coded bits is located after a segment parser.

It can be understood that, if there is only one segment, for example, the plurality of channel sets are in some or all frequency bands in a continuous 80-MHz frequency band, according to an existing Wi-Fi protocol, segmentation is not required, and therefore a segment deparser is not required.

It should be noted that 80 MHz is used as a segment in the existing Wi-Fi protocol. Certainly, with progress of a radio frequency (RF) technology, a group of RF devices may be capable of supporting sending and receiving of a radio frequency signal with a higher bandwidth in the future. Therefore, a next-generation Wi-Fi protocol that can support an ultra-high bandwidth may also introduce a segment with a higher bandwidth, for example, a 160-MHz bandwidth used as a segment; more than two segments, for example, three segments; and segments with different bandwidths, for example, segments with bandwidths of 80 MHz and 160 MHz.

It can be understood that, if an actually required bandwidth is comparatively low, for example, 40 MHz, a segment less than 80 MHz may be alternatively obtained through division. Details are not described in this embodiment of this application.

When there are a plurality of segments, a method similar to the methods for distributing coded bits to a plurality of

TABLE 2

| Distribution manner | Preset RU | Plurality of RUs | Formula | Modulation order | Quantity of coded bits distributed each time | Distribution pattern | Remarks |
|---|---|---|---|---|---|---|---|
| 1 | RU26 | RU52 | (1) | 2 | 1 | 0, 2, . . . | Fully loaded first |
|  |  | RU106 | (1) | 2 | 1 | 1, 3, . . . | Fully loaded later |
| 2 | RU52 | RU52 | (2) | 2 | 1 | 0, 3, . . . | Fully loaded first |
|  |  | RU106 | (2) | 2 | 2 | 1, 2, 4, 5, . . . | Fully loaded later |
| 3 | RU26 | RU52 | (2) | 2 | 2 | 0, 1, 6, 7, . . . | Fully loaded first |
|  |  | RU106 | (2) | 2 | 4 | 2, 3, 4, 5, 8, 9, 10, 11, . . . | Fully loaded later |

It should be noted that the resource unit parser may alternatively distribute coded bits to each resource unit using a method similar to the foregoing distribution manners of distributing coded bits to each channel set by the channel parser. For example, in addition to the three distribution manners shown in Table 2, there may be another distribution manner. Refer to related text descriptions of the foregoing distribution manners of distributing coded bits to each channel sets by a channel parser in FIG. 6A to FIG. 6H, or a method similar to the methods for distributing coded bits to a plurality of resource units by a resource unit parser in FIG. 7A to FIG. 7C may be used, and a segment parser distributes coded bits to a plurality of segments.

For example, in a possible design method, the distribution rule may include the following.

A quantity of coded bits distributed by the network device to a plurality of segments in a cyclic polling manner meets a first preset relationship. The first preset relationship is used to determine a quantity of coded bits distributed to one segment at a time. For example, the first preset relationship may be as follows:

$$S_i = \max\left(1, \frac{s_i}{2}\right),$$

where $S_i$ is a quantity of coded bits distributed to an $i^{th}$ segment at a time, $s_i$ is a modulation order of constellation point mapping included in an MCS for the $i^{th}$ segment, $i \leq M$, and M is a quantity of the plurality of segments.

For example, in another possible design method, the distribution rule may include the following.

A quantity of coded bits distributed by the network device to a plurality of segments in a cyclic polling manner meets a second preset relationship. The second preset relationship is used to determine a quantity of coded bits distributed to one segment at a time. For example, the second preset relationship may be as follows:

$$S_i = N_i \times \max\left(1, \frac{s_i}{2}\right),$$

where $S_i$ is a quantity of coded bits distributed to an $i^{th}$ segment at a time, $s_i$ is a modulation order of constellation point mapping included in an MCS for the $i^{th}$ segment, $i \leq M$, M is a quantity of the plurality of segments, and $N_i$ is a quantity of preset segments included in the $i^{th}$ segment, where the preset segment may be a segment with a bandwidth of 20 MHz, or may be a segment supported by an existing Wi-Fi system, for example, an 80-MHz segment supported by the 802.11ax protocol, or may be a segment whose bandwidth is a common divisor of bandwidths of the plurality of segments.

Further, in another possible design method, the distribution rule may further include the following.

Distribution of the coded bits is cyclic distribution performed using, as a unit, data carried in a data tone of an OFDM symbol. If at least one of the plurality of segments is fully loaded with coded bits distributed to the segment (data tones included in the segment are fully loaded), the network device stops distributing coded bits to the at least one of the plurality of segments, continues to distribute coded bits to another segment in the plurality of segments according to the distribution rule, and after all the plurality of segments are fully loaded with coded bits distributed to the segments to form an OFDM symbol, continues to perform a next round of distribution, in order to send coded bits using all spectrum resources in all the segments, thereby avoiding idleness of some spectrum resources, and further improving spectrum resource utilization and a data rate.

As shown in Table 3, there are three segments in total: a segment 1 (20 MHz), a segment 2 (80 MHz), and a segment 3 (160 MHz), and a modulation order of each segment is 2.

For example, using a distribution manner 1 shown in Table 3 as an example, steps of distributing coded bits to the foregoing three segments by a segment parser are as follows.

Distribution manner 1 is as follows.

Step 1: Calculate, according to the formula (2), quantities of coded bits distributed to the segments 1 to 3 each time, where the quantities are 1, 4, and 8 respectively.

Step 2: In each round of distribution, successively distribute one coded bit, four coded bits, and eight coded bits to the segments 1 to 3 respectively.

For example, in a first round, a coded bit 0 is distributed to the segment 1, coded bits 1 to 4 are distributed to the segment 2, and coded bits 5 to 12 are distributed to the segment 3; in a second round, a coded bit 13 is distributed to the segment 1, coded bits 14 to 17 are distributed to the segment 2, and coded bits 18 to 25 are distributed to the segment 3.

Step 3: Cyclically perform step 2 until the segment 1 is fully loaded first but the segments 2 and 3 have not been fully loaded.

Step 4: Stop distributing coded bits to the segment 1, and continue to distribute coded bits to the segments 2 and 3 until the segments 2 and 3 are also fully loaded simultaneously, in order to transmit coded bits using all tones included in the segments 2 and 3, thereby avoiding a waste.

It should be noted that, for a distribution manner 2 in Table 3, reference may be made to FIG. 6A to FIG. 6H and corresponding text descriptions. Details are not described again in this embodiment of this application.

In addition, distribution manners shown in Table 3 may be separately implemented, or may be used in combination with the distribution manners shown in Table 1 and/or the distribution manners shown in Table 2. This is not limited in this embodiment of this application.

TABLE 3

| Distribution manner | Preset segment | Plurality of segments | Formula | Modulation order | Quantity of coded bits distributed each time | Distribution pattern | Remarks |
|---|---|---|---|---|---|---|---|
| 1 | 20 MHz | 20 MHz | (2) | 2 | 1 | 0, 13, . . . | Fully loaded first |
|  |  | 80 MHz | (2) | 2 | 4 | 1-4, 14-17, . . . | Fully loaded later |
|  |  | 160 MHz | (2) | 2 | 8 | 5-12, 18-25, . . . | Fully loaded later |
| 2 | 20 MHz | 20 MHz | (1) | 2 | 1 | 0, 3, . . . | Fully loaded first |

TABLE 3-continued

| Distribution manner | Preset segment | Plurality of segments | Formula | Modulation order | Quantity of coded bits distributed each time | Distribution pattern | Remarks |
|---|---|---|---|---|---|---|---|
| | | 80 MHz | (1) | 2 | 1 | 1, 4, . . . | Fully loaded later |
| | | 160 MHz | (1) | 2 | 1 | 2, 5, . . . | Fully loaded later |

For example, as shown in Table 4, there are two segments in total: a segment 1 (80 MHz) and a segment 2 (160 MHz), and a modulation order of each segment is 2.

For example, using a distribution manner 3 shown in Table 4 as an example, steps of distributing coded bits to the foregoing two segments by a segment parser are as follows.

Distribution manner 3 is as follows.

Step 1: Calculate, according to the formula (2), quantities of coded bits distributed to the segments 1 and 2 each time, where the quantities are 1 and 2 respectively.

Step 2: In each round of distribution, successively distribute one coded bit and two coded bits to the segments 1 and 2 respectively.

For example, in a first round, a coded bit 0 is distributed to the segment 1, and coded bits 1 and 2 are distributed to the segment 2; in a second round, a coded bit 3 is distributed to the segment 1, and coded bits 4 and 5 are distributed to the segment 2.

Step 3: Cyclically perform step 2 until the segments 1 and 2 are fully loaded simultaneously.

It should be noted that, for distribution manners 1 and 2 in Table 4, reference may be made to FIG. 6A to FIG. 6H and corresponding text descriptions. Details are not described again in this embodiment of this application.

In addition, distribution manners shown in Table 4 may be separately implemented, or may be used in combination with the distribution manners shown in Table 1 and/or the distribution manners shown in Table 2. This is not limited in this embodiment of this application.

For example, the segment parser, the channel parser, and the resource unit parser may be uniformly designed as a modular parser, and the modular parser may implement a function of one of the segment parser, the channel parser, or the resource unit parser based on different configuration parameters, to increase a reuse rate of a design solution, reduce maintenance complexity, and improve development efficiency.

For example, at least two of the segment parser, the channel parser, and the resource unit parser may be alternatively designed as one parser, and the parser is configured to directly distribute coded bits to each channel set included in each segment, or to each resource unit included in each channel set of each segment.

It should be noted that various parameters, such as a coding scheme, a modulation order, a preset spectrum resource, and a formula for calculating a quantity of coded bits distributed each time, in the foregoing coded bit distribution methods may be separately configured for different segments, different channel sets in one segment, or different resource units in one channel set. The preset spectrum resource may be one of the preset channel, the preset resource unit, or the preset segment.

It can be understood that a quantity of coded bits mapped to one channel set at a time is a sum of quantities of coded bits mapped to all resource units included in the channel set at a time, and a quantity of coded bits mapped to one segment at a time is a sum of quantities of coded bits mapped to all channel sets included in the segment at a time.

TABLE 4

| Distribution manner | Preset segment | Plurality of segments | Formula | Modulation order | Quantity of coded bits distributed each time | Distribution pattern | Remarks |
|---|---|---|---|---|---|---|---|
| 1 | 20 MHz | 80 MHz | (2) | 2 | 4 | 0-3, 12-15, . . . | Fully loaded simultaneously |
| | | 160 MHz | (2) | 2 | 8 | 4-11, 16-23, . . . | Fully loaded simultaneously |
| 2 | 40 MHz | 80 MHz | (2) | 2 | 2 | 0-1, 6-7, . . . | Fully loaded simultaneously |
| | | 160 MHz | (2) | 2 | 4 | 2-5, 8-11, . . . | Fully loaded simultaneously |
| 3 | 80 MHz | 80 MHz | (2) | 2 | 1 | 0, 6, . . . | Fully loaded simultaneously |
| | | 160 MHz | (2) | 2 | 2 | 1-2, 7-8, . . . | Fully loaded simultaneously |

Figure 8A:
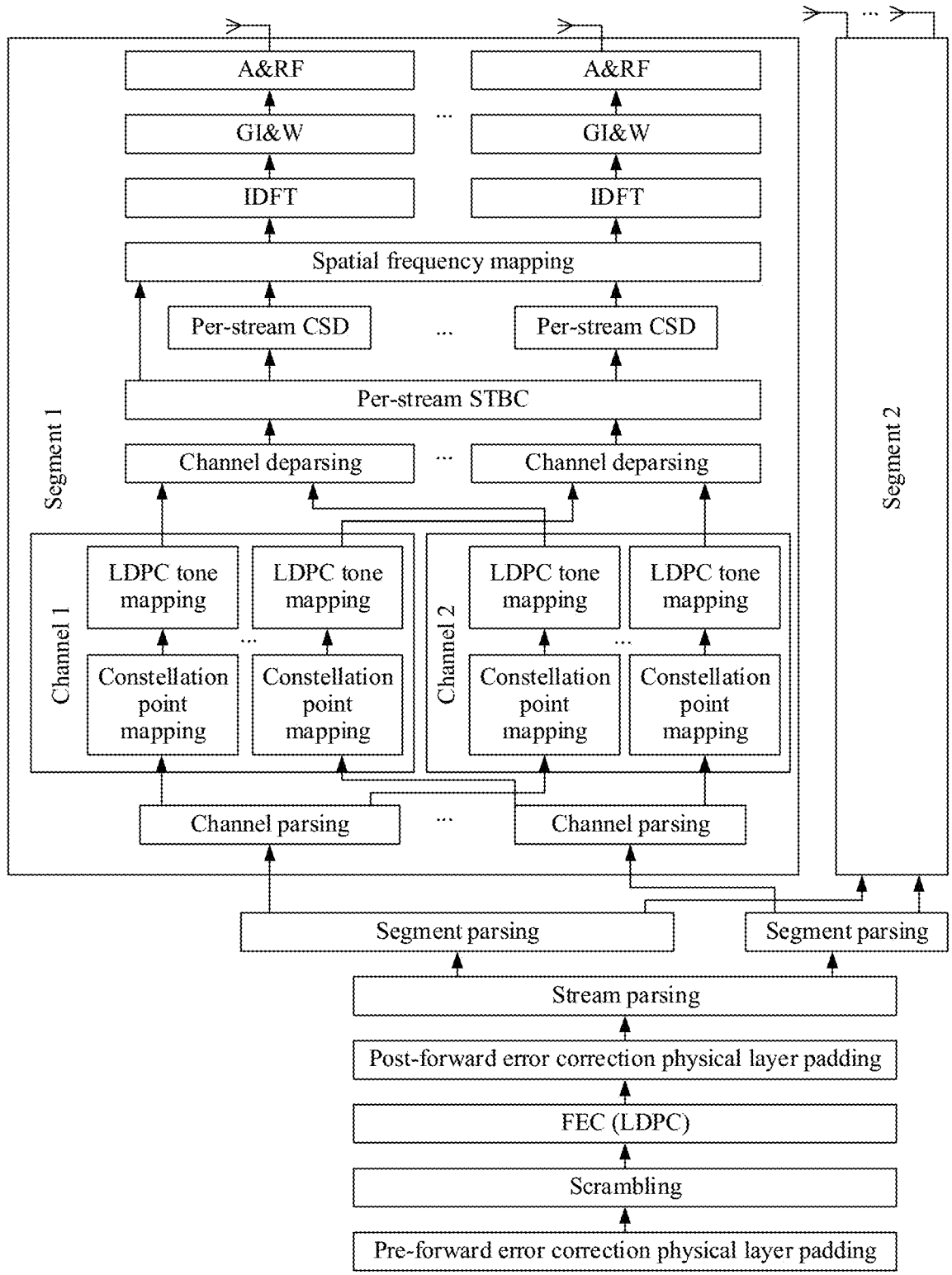
FIG. 8A is a schematic flowchart 2 of a coded bit transmission method according to an embodiment of this application.

FIG. 8A is a schematic flowchart of a coded bit distribution method according to an embodiment of this application. As shown in FIG. 8A, there are two segment parsers after a stream parser, each segment includes a plurality of channel sets, and each channel set requires one channel parser. In addition, before a per-stream space-time encoder, each channel includes a channel deparser that is in a one-to-one correspondence with a channel parser, to perform space-time coding on modulated symbols in each channel set that are obtained through constellation point mapping and tone mapping.

It should be noted that, as shown in FIG. 8A, if two segments are discontinuous, because an independent analog circuit and radio frequency circuit are usually configured for each segment, modulated symbols of the segments do not need to be combined for processing, and only a remaining distribution procedure needs to be performed for the modulated symbols of the segments. Therefore, no segment deparser is required.

Certainly, if the foregoing two segments are continuous, a segment deparser needs to be disposed after channel deparsing and before per-stream space-time coding, and modulated symbols of the segments are combined and then sent.

It can be understood that the receiver needs to receive the coded bits according to a method procedure opposite to a sequence shown in FIG. 8A. For example, the coded bits may be successively received and combined in ascending order of granularities of a channel set, a segment, and a stream, and then channel decoding is performed on combined coded bits, to obtain the information bits sent by the sender.

It should be noted that a sending procedure shown in FIG. 8A is described using an example of a scenario with the plurality of channel sets used for the single-user preamble puncturing transmission.

Figure 8B:
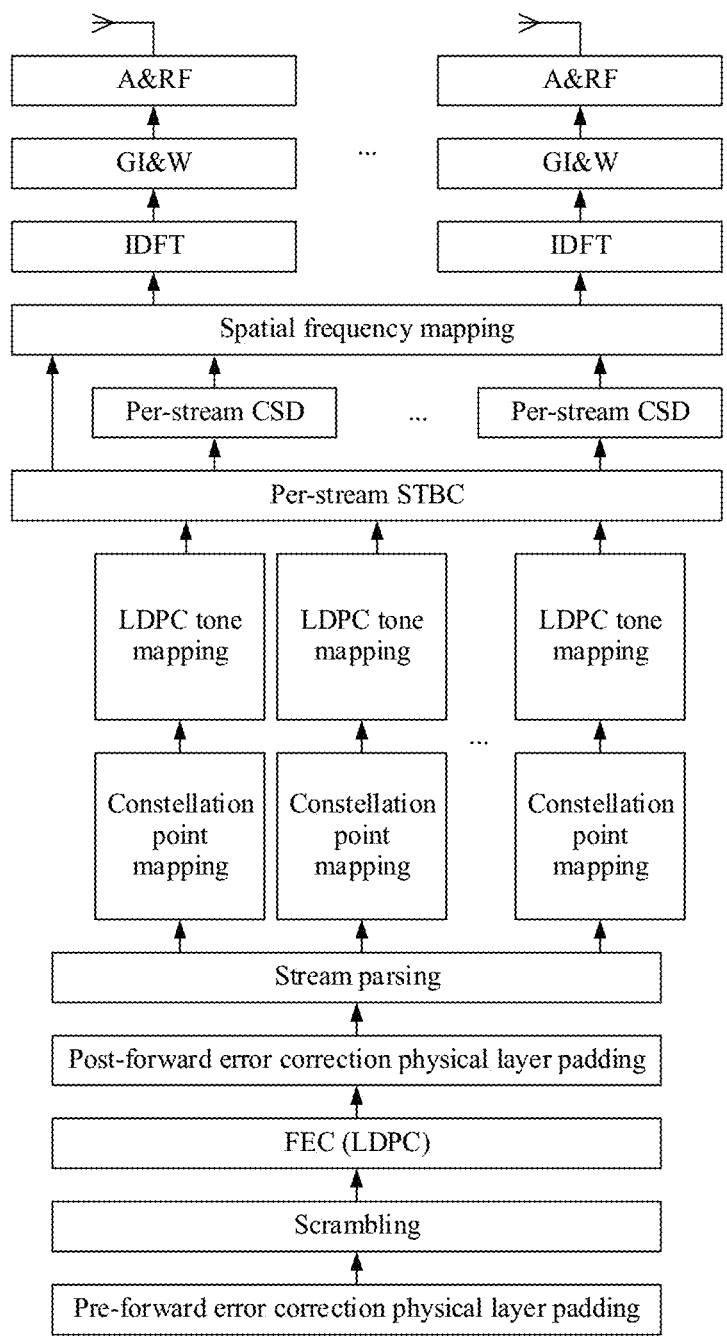
FIG. 8B is a schematic flowchart 3 of a coded bit transmission method according to an embodiment of this application.

It can be understood that, if the coded bits need to be distributed to the plurality of resource units used for the OFDMA transmission, channel parsing and channel deparsing shown in FIG. 8A may be alternatively replaced with resource unit parsing and resource unit deparsing respectively. In addition, because a quantity of tones included in an existing resource unit is usually less than or equal to a quantity of tones included in an 80-MHz bandwidth, that is, a bandwidth of a sent PPDU is usually less than or equal to 80 MHz, the segment parser and the segment deparser in FIG. 8A are not required either. Because of the foregoing reasons, for a sending procedure of distributing the coded bits to the plurality of resource units used for the OFDMA transmission, refer to FIG. 8B.

It should be noted that, the 802.11ax protocol stipulates that BCC coding is a coding scheme required for an RU26-tone, RU52-tone, RU106-tone, or RU242-tone resource unit, and LDPC coding is an only coding scheme for an RU484, RU996, or RU996*2 resource unit, and is also an optional coding scheme for the RU26-tone, RU52-tone, RU106-tone, or RU242-tone resource unit. Therefore, if a resource unit is the RU26-tone, RU52-tone, RU106-tone, or RU242-tone resource unit, the LDPC coding in FIG. 8B may be replaced with the BCC coding, and LDPC tone mapping may be replaced with a BCC interleaver, where a location of the BCC interleaver needs to be adjusted to be after constellation point mapping.

S503. The terminal device receives, according to a receiving and combination rule, the coded bits that are carried in the plurality of channel sets used for the single-user preamble puncturing transmission or the plurality of resource units used for the OFDMA transmission.

The receiving and combination rule corresponds to the foregoing distribution rule, and is an inverse procedure of the processing procedure stipulated by the foregoing distribution rule.

In a possible design method, the receiving and combination rule may include the following.

A quantity of coded bits received by the terminal device from the plurality of channel sets or the plurality of resource units in a cyclic polling manner meets a first preset relationship. The first preset relationship is used to determine a quantity of coded bits received from one channel set or resource unit at a time. For example, the first preset relationship may be as follows:

$$S_i = \max\left(1, \frac{s_i}{2}\right),$$

where $S_i$ is a quantity of coded bits received from an $i^{th}$ channel set or an $i^{th}$ resource unit at a time, $s_i$ is a modulation order of constellation point mapping included in an MCS for the $i^{th}$ channel set or the $i^{th}$ resource unit, $i \leq M$, and M is a quantity of the channel sets or a quantity of the plurality of resource units.

It can be understood that, according to the foregoing receiving method, two adjacent groups of coded bits are definitely coded bits received by the terminal device from different channel sets or resource units, to reduce interference and obtain an interleaving gain in frequency domain.

In another possible design method, the receiving and combination rule may include:

A quantity of coded bits received by the terminal device from the plurality of channel sets or the plurality of resource units in a cyclic polling manner meets a second preset relationship. The second preset relationship is also used to determine a quantity of coded bits received from one channel set or resource unit at a time. For example, the second preset relationship may be as follows:

$$S_i = N_i \times \max\left(1, \frac{s_i}{2}\right),$$

where $S_i$ is a quantity of coded bits received from an $i^{th}$ channel set or an $i^{th}$ resource unit at a time, $s_i$ is a modulation order of constellation point mapping included in an MCS for the $i^{th}$ channel set or the $i^{th}$ resource unit, $i \leq M$, M is a quantity of the plurality of channel sets or a quantity of the plurality of resource units, $N_i$ is a quantity of preset channels included in the $i^{th}$ channel set, or a quantity of preset resource units included in the $i^{th}$ resource unit, and the quantity of preset resource units is a positive integer obtained by rounding off a quotient of a quantity of tones included in the $i^{th}$ resource unit and a quantity of tones included in the preset resource unit.

It can be understood that two adjacent groups of coded bits are definitely coded bits received from different channel sets or resource units, to reduce interference and obtain an interleaving gain in frequency domain.

For example, the preset channel may be a channel with a minimum bandwidth supported by a Wi-Fi system, or may be a channel whose bandwidth is a common divisor of bandwidths of the plurality of channel sets.

Likewise, the preset resource unit may be a minimum resource unit supported by a Wi-Fi system, or may be a resource unit including a quantity of tones that is a common divisor of a quantity of tones included in the plurality of resource units.

In another possible design method, the receiving and combination rule may further include: if all coded bits carried in at least one of the plurality of channel sets are received, stopping receiving coded bits from the at least one of the plurality of channel sets, continuing to receive coded bits from another channel set in the plurality of channel sets according to the receiving and combination rule, and after all coded bits carried in the plurality of channel sets are received, continuing to perform a next round of receiving, in order to receive coded bits using all spectrum resources in all the channel sets, thereby avoiding idleness of some spectrum resources, and further improving spectrum resource utilization and a data rate.

In another possible design method, the receiving and combination rule may further include the following.

If all coded bits carried in at least one of the plurality of resource units are received, the terminal device stops receiving coded bits from the at least one of the plurality of resource units, continues to receive coded bits from another resource unit in the plurality of resource units according to the receiving and combination rule, and after all coded bits carried in the plurality of resource units are received, continues to perform a next round of receiving, in order to receive coded bits using all tones in all the resource units, thereby avoiding idleness of some tones, and further improving spectrum resource utilization and a data rate.

It should be noted that whether the plurality of channel sets or the plurality of resource units are continuous is not limited in this embodiment of this application. Therefore, the plurality of channel sets may be continuous or discontinuous in frequency domain. Correspondingly, the plurality of resource units may be continuous or discontinuous in frequency domain.

Optionally, for the OFDMA transmission, the plurality of resource units may be allocated to one station or one station set. For example, if both resource units A and B are used to carry coded bits of stations 1 and 2, the stations 1 and 2 may be treated as one station set.

Optionally, the plurality of channel sets may be channel sets including at least one of the following bandwidths: 20 megahertz MHz, 40 MHz, 80 MHz, or 160 MHz.

Optionally, to reduce operation complexity of performing down-conversion and demodulation on a received radio frequency signal to recover the coded bits, and improve receiving efficiency, a same MCS may be used for the plurality of channel sets used for the single-user preamble puncturing transmission, or a same MCS may be used for the plurality of resource units used for the OFDMA transmission. Therefore, if a same MCS is used, the plurality of channel sets or the plurality of resource units may share one demodulator (one group of demodulators), to reduce system complexity and costs.

It should be noted that S503 is an inverse process of S502. By performing S503, the terminal device can recover the coded bits sent by the network device.

S504. The terminal device performs channel decoding on the coded bits according to the MCS, to generate the information bits.

Optionally, to reduce operation complexity of performing channel decoding on the received coded bits to recover the information bits, and improve receiving efficiency, a same MCS may be used for the plurality of channel sets used for the single-user preamble puncturing transmission, or a same MCS may be used for the plurality of resource units used for the OFDMA transmission. Therefore, if a same MCS is used, the plurality of channel sets or the plurality of resource units may share one decoder (one group of decoders), to reduce system complexity and costs. Because channel decoding belongs to other approaches, details are not described in this embodiment of this application.

It should be noted that S504 is an inverse process of S501. By performing S504, the terminal device can recover the information bits sent by the network device, that is, complete communication between the network device and the terminal device.

In addition, S501 to S504 are described using an example in which a sender is a network device and a receiver is a terminal device. Actually, the foregoing method embodiment is applicable to a scenario in which a sender and a receiver each are a device set including at least one terminal device and/or at least one network device.

For example, the sender is a terminal device 1, configured to perform S501 and S502; and the receiver is a network device A, configured to perform S503 and S504.

For example, the sender is a terminal device 1, configured to perform S501 and S502; and the receiver is a terminal device 2, configured to perform S503 and S504.

For example, the sender is a network device A, configured to perform S501 and S502; and the receiver is a network device B, configured to perform S503 and S504.

It should be noted that the sender may also receive coded bits sent by the receiver, and the receiver may also send coded bits to the sender, to implement bidirectional communication.

In a possible design method, before S501 to S504 are performed, a controlling device further needs to determine a to-be-used MCS, a distribution rule, and a receiving and combination rule, and deliver the MCS, the distribution rule, and the receiving and combination rule to a controlled device. The controlling device is a network device or a terminal device in a controlling position, and may be one of the sender or the receiver, or may be another network device other than the sender and the receiver, for example, a server. The controlled device is a network device and/or a terminal device in a controlled position, and may be some or all of the devices of the sender and the receiver.

For example, if the sender and the receiver include a network device, the network device may be a controlling device, or an upper-layer network device of the network device, for example, a core network device, may be a controlling device. For example, if both the sender and the receiver are terminal devices, one of the terminal devices, for example, a terminal device that provides a Wi-Fi hotspot, may be a controlling device, and the other terminal device is a controlled device.

It can be understood that there may be one or more senders and receivers, to support one-to-one, one-to-many, many-to-one, or many-to-many communication.

According to the coded bit transmission method provided in this application, the sender can select an MCS for each of the plurality of channel sets used for the single-user preamble puncturing transmission or each of the plurality of resource units used for the OFDMA transmission, perform channel coding on the information bits to generate the coded bits, and distribute the coded bits to the plurality of channel sets or the plurality of resource units according to the distribution rule; and correspondingly, the receiver can combine, according to the receiving and combination rule, the coded bits received from the plurality of channel sets or the plurality of resource units, and then perform channel decoding on the received coded bits according to the MCS, to generate the information bits. The plurality of channel sets or the plurality of resource units may be continuous or discontinuous, and sizes of the plurality of channel sets or the plurality of resource units may be the same or different. Therefore, according to the coded bit transmission method provided in this application, a network device such as an AP and a terminal device such as an STA in a Wi-Fi system can transmit coded bits in a plurality of discontinuous channel sets or resource units, to avoid a case in which some of the plurality of channel sets or some of the plurality of resource units are idle, such that spectrum resource utilization and a data rate of the Wi-Fi system can be improved.

The foregoing describes in detail the coded bit transmission method provided in the embodiments of this application with reference to FIG. 1 to FIG. 8B. The following describes in detail a communications apparatus provided in the embodiments of this application with reference to FIG. 9 to FIG. 11.

Figure 9:
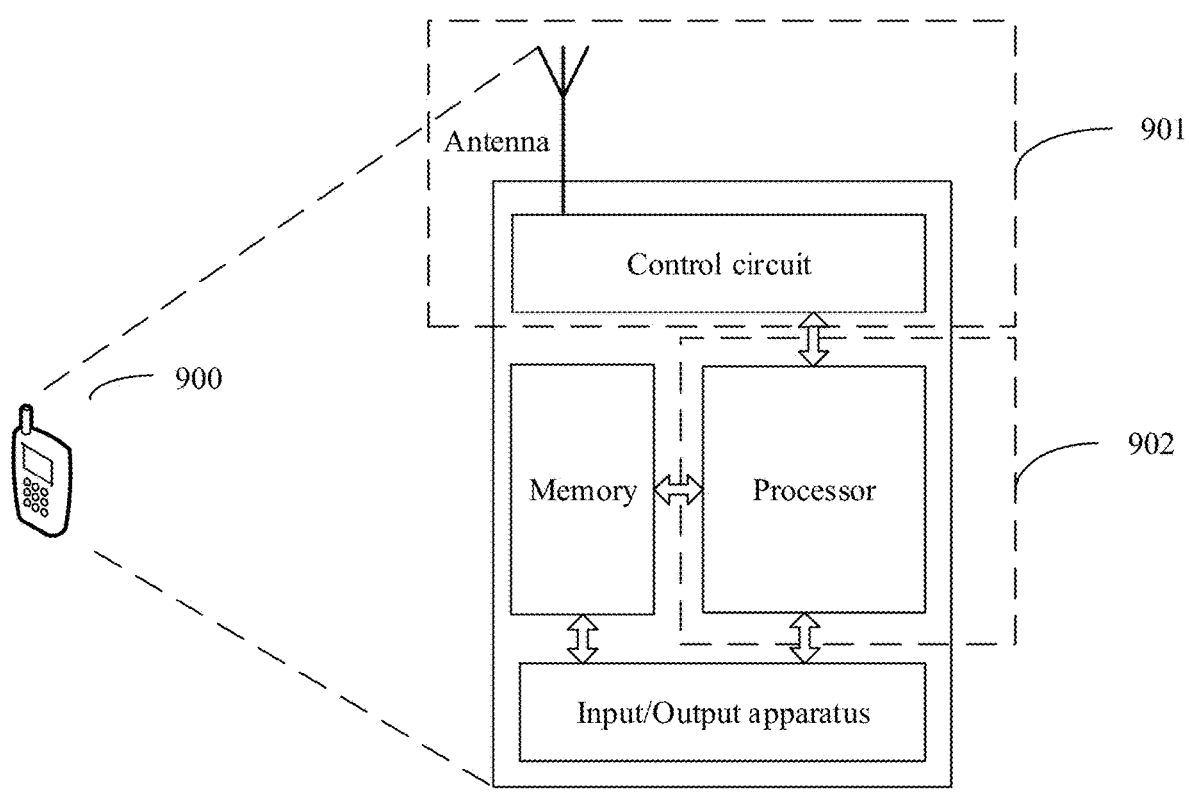
FIG. 9 is a schematic structural diagram of a terminal device according to an embodiment of this application.

FIG. 9 is a schematic structural diagram of a terminal device according to an embodiment of this application. The terminal device is applicable to the communications system shown in FIG. 1, to perform the function of distributing and/or receiving the coded bits in the foregoing method embodiments. For ease of description, FIG. 9 shows only main components of the terminal device. As shown in FIG. 9, the terminal device 900 includes a processor, a memory, a control circuit, an antenna, and an input/output apparatus. The processor is mainly configured to process a communication protocol and communication data, control the entire terminal device, execute a software program, and process data of the software program, for example, configured to support the terminal device in performing the actions described in the foregoing method embodiments, for example, S503 and S504. The memory is mainly configured to store the software program and the data, for example, store the information bits and the coded bits described in the foregoing embodiments. The control circuit is mainly configured to perform conversion between a baseband signal and a radio frequency signal, and process a radio frequency signal. The control circuit and the antenna may also be collectively referred to as a transceiver, mainly configured to send or receive a radio frequency signal in an electromagnetic wave form. The input/output apparatus, such as a touchscreen, a display screen, or a keyboard, is mainly configured to receive data entered by a user and output data to the user.

After the terminal device is powered on, the processor may read the software program in the memory, interpret and execute an instruction of the software program, and process the data of the software program. When data needs to be sent wirelessly, the processor performs baseband processing on the to-be-sent data, and outputs a baseband signal to a radio frequency circuit. After performing radio frequency processing on the baseband signal, the radio frequency circuit sends a radio frequency signal in an electromagnetic wave form using the antenna. When data is sent to the terminal device, the radio frequency circuit receives a radio frequency signal using the antenna, converts the radio frequency signal into a baseband signal, and outputs the baseband signal to the processor. The processor converts the baseband signal into data, and processes the data.

A person skilled in the art can understand that, for ease of description, FIG. 9 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data. The central processing unit is mainly configured to control the entire terminal device, execute a software program, and process data of the software program. The processor in FIG. 9 may integrate functions of the baseband processor and the central processing unit. A person skilled in the art can understand that the baseband processor and the central processing unit may be alternatively processors independent of each other, and are interconnected using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, where the processor executes the software program to implement a baseband processing function.

In this embodiment of this application, the antenna with sending and receiving functions and the control circuit may be treated as a transceiver 901 of the terminal device 900, for example, configured to support the terminal device in performing the receiving function and the sending function described in FIG. 5. The processor with a processing function is treated as a processing unit 902 of the terminal device 900. As shown in FIG. 9, the terminal device 900 includes the transceiver 901 and the processing unit 902. The transceiver may also be referred to as a transceiver device, a transceiver apparatus, or the like. Optionally, a device that is in the transceiver 901 and that is configured to implement a receiving function may be treated as a receiving unit, and a device that is in the transceiver 901 and that is configured to implement a sending function may be treated as a sending unit. In other words, the transceiver 901 includes the receiving unit and the sending unit. The receiving unit may also be referred to as a receiver, an input interface, a receiving circuit, or the like. The sending unit may be referred to as a transmitter device, a transmitter, a transmitting circuit, or the like.

The processor 902 may be configured to execute the instruction stored in the memory, to control the transceiver 901 to receive a signal and/or send a signal, to complete a function of the terminal device in the foregoing method embodiments. In an implementation, a function of the transceiver 901 may be implemented using a transceiver circuit or a dedicated transceiver chip.

Figure 10:
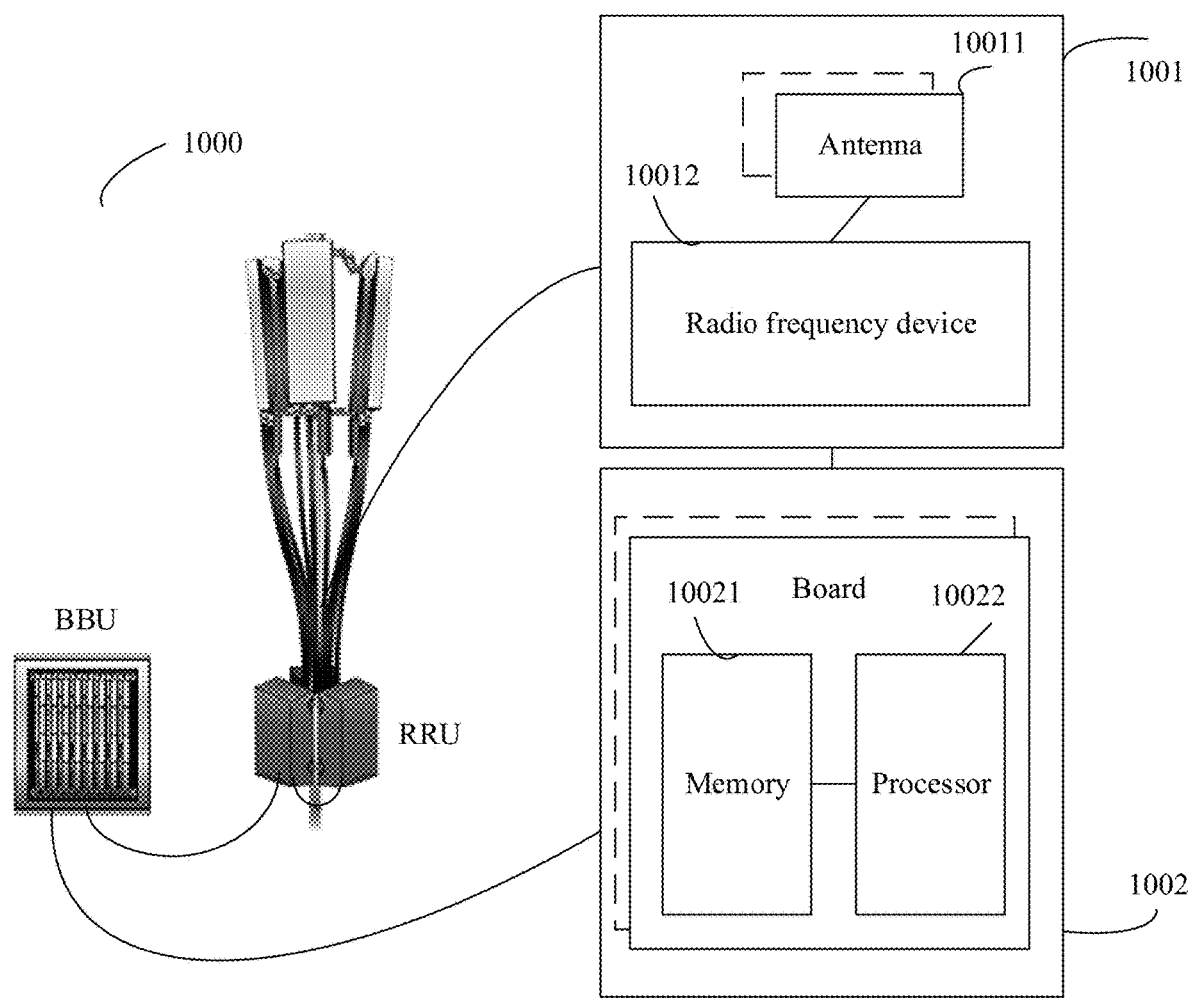
FIG. 10 is a schematic structural diagram of a network device according to an embodiment of this application.

FIG. 10 is a schematic structural diagram of a network device according to an embodiment of this application. For example, FIG. 10 may be a schematic structural diagram of an access point. As shown in FIG. 10, the network device 1000 may be used for the communications system shown in FIG. 1, to perform the function of distributing and/or receiving the coded bits in the foregoing method embodiments. The network device 1000 may include one or more radio frequency devices, for example, a remote radio unit (remote radio unit, RRU) 1001 and one or more baseband units (baseband unit, BBU) 1002. The RRU 1001 may be referred to as a transceiver device, a transceiver circuit, a transceiver, or the like, and may include at least one antenna 10011 and a radio frequency device 10012. The RRU 1001 is mainly configured to send or receive a radio frequency signal, and perform conversion between a radio frequency signal and a baseband signal, for example, configured to send the coded bits in the foregoing embodiments to a terminal device. The BBU 1002 is mainly configured to perform baseband processing, control the access point, or the like. The RRU 1001 and the BBU 1002 may be physically disposed together, or may be physically disposed separately, that is, a distributed access point.

The BBU 1002 is a control center of the network device 1000, may also be referred to as a processing unit, and is mainly configured to perform baseband processing functions such as channel coding, multiplexing, modulation, and spectrum spreading. For example, the BBU 1002 may be configured to control the network device 1000 to perform an operation procedure related to the network device in the foregoing method embodiments.

In an example, the BBU 1002 may include one or more boards. A plurality of boards may jointly support a radio access network of a single access standard (for example, a Wi-Fi network), or may separately support radio access networks of different access standards (for example, a Wi-Fi network, a 5G network, and another network). The BBU 1002 further includes a memory 10021 and a processor 10022. The memory 10021 is configured to store a necessary instruction and necessary data. For example, the memory 10021 stores the information bits and the coded bits in the foregoing embodiments. The processor 10022 is configured to control the network device 1000 to perform a necessary action, for example, configured to control the network device 1000 to perform S501 to S503. The memory 10021 and the processor 10022 may serve one or more boards. In other words, a memory and a processor may be separately disposed on each board; or a plurality of boards may share a same memory and a same processor. In addition, a necessary circuit may be further disposed on each board.

Figure 11:
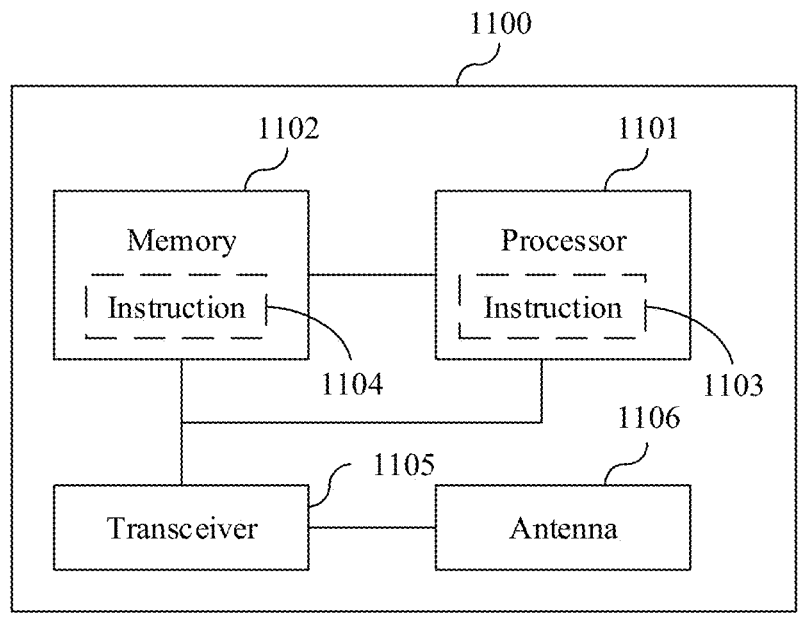
FIG. 11 is a schematic structural diagram of a coded bit transmission apparatus according to an embodiment of this application.

FIG. 11 is a schematic structural diagram of a communications apparatus 1100. The apparatus 1100 may be configured to implement the methods described in the foregoing method embodiments. Refer to the descriptions in the foregoing method embodiments. The communications apparatus 1100 may be a chip, a network device such as an access point, or a terminal device such as a station.

The communications apparatus 1100 includes one or more processors 1101. The processor 1101 may be a general-purpose processor, a dedicated processor, or the like. For example, the processor 1101 may be a baseband processor or a central processing unit. The baseband processor may be configured to process a communication protocol and communication data. The central processing unit may be configured to control the communications apparatus (for example, the access point, the station, or the chip), execute a software program, and process data of the software program. The communications apparatus may include a transceiver, configured to input (receive) or output (send) a signal. For example, the communications apparatus may be a chip, and the transceiver may be an input and/or output circuit of the chip, or a communications interface. The chip may be used for a terminal, a base station, or another network device. For another example, the communications apparatus may be a terminal, a base station, or another network device, and the transceiver may be a radio frequency chip.

The communications apparatus 1100 includes one or more processors 1101. The one or more processors 1101 may implement the method for the network device or the terminal device in the embodiment shown in FIG. 5.

In a possible design, the communications apparatus 1100 includes a means configured to generate an MCS, a distribution rule, and a receiving and combination rule, and a means configured to send the MCS, the distribution rule, and the receiving and combination rule. Functions of the means for generating the MCS, the distribution rule, and the receiving and combination rule and the means for sending the MCS, the distribution rule, and the receiving and combination rule may be implemented by one or more processors. For example, the MCS, the distribution rule, and the receiving and combination rule may be generated using one or more processors, and the MCS, the distribution rule, and the receiving and combination rule may be sent using an input/output circuit or an interface of a chip. For the MCS, the distribution rule, and the receiving and combination rule, refer to related descriptions in the foregoing method embodiments.

In a possible design, the communications apparatus 1100 includes a means configured to receive the MCS, the distribution rule, and the receiving and combination rule. For the MCS, the distribution rule, and the receiving and combination rule, refer to related descriptions in the foregoing method embodiments. For example, the MCS, the distribution rule, and the receiving and combination rule may be received using an input/output circuit or an interface of a chip.

Optionally, in addition to implementing the method in the embodiment shown in FIG. 5, the processor 1101 may further implement another function.

Optionally, in a design, the processor 1101 may further include an instruction 1103, and the instruction may be run on the processor, such that the communications apparatus 1100 performs the methods described in the foregoing method embodiments.

In another possible design, the communications apparatus 1100 may alternatively include a circuit, and the circuit may implement a function of the network device or the terminal device in the foregoing method embodiments.

In another possible design, the communications apparatus 1100 may include one or more memories 1102. The memory 1102 stores an instruction 1104, and the instruction may be run on the processor, such that the communications apparatus 1100 performs the methods described in the foregoing method embodiments. Optionally, the memory may further store data. Optionally, the processor may also store an instruction and/or data. For example, the one or more memories 1102 may store the coded bits and the information bits described in the foregoing embodiments, or the MCS, the distribution rule, the receiving and combination rule, and the like in the foregoing embodiments. The processor and the memory may be disposed separately, or may be integrated.

In another possible design, the communications apparatus 1100 may further include a transceiver 1105 and an antenna 1106. The processor 1101 may be referred to as a processing unit, and controls the communications apparatus (e.g., the station or the access point). The transceiver 1105 may be referred to as a transceiver device, a transceiver circuit, or the like, and is configured to implement sending and receiving functions of the communications apparatus using the antenna 1106

In the embodiments of this application, a distribution apparatus that performs a coded bit distribution function and a receiving apparatus that performs a coded bit receiving function may be divided into functional modules or functional units based on the foregoing method examples. For example, each functional module or functional unit may be obtained through division based on each corresponding function, or two or more functions may be integrated into one processing module. The foregoing integrated module may be implemented in a form of hardware, or may be implemented in a form of a software functional module or functional unit. In this embodiment of this application, module or unit division is an example, and is merely a logical function division. In actual implementation, another division manner may be used.

Figure 12:
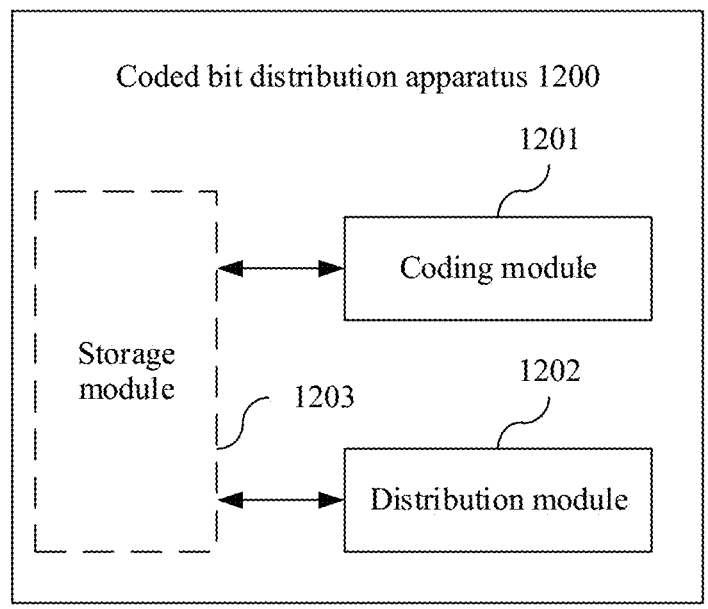
FIG. 12 is a schematic structural diagram of a coded bit distribution apparatus according to an embodiment of this application.

FIG. 12 is a possible schematic structural diagram of the coded bit distribution apparatus. The distribution apparatus includes a coding module 1201 and a distribution module 1202. The coding module 1201 and the distribution module 1202 perform corresponding steps in the foregoing corresponding methods. It should be understood that the coded bit distribution apparatus in FIG. 12 has any function of the coded bit distribution apparatus in the foregoing corresponding methods. Optionally, as shown in FIG. 12, the distribution apparatus may further include a storage module 1203, configured to store to-be-coded bits and coded bits.

Figure 13:
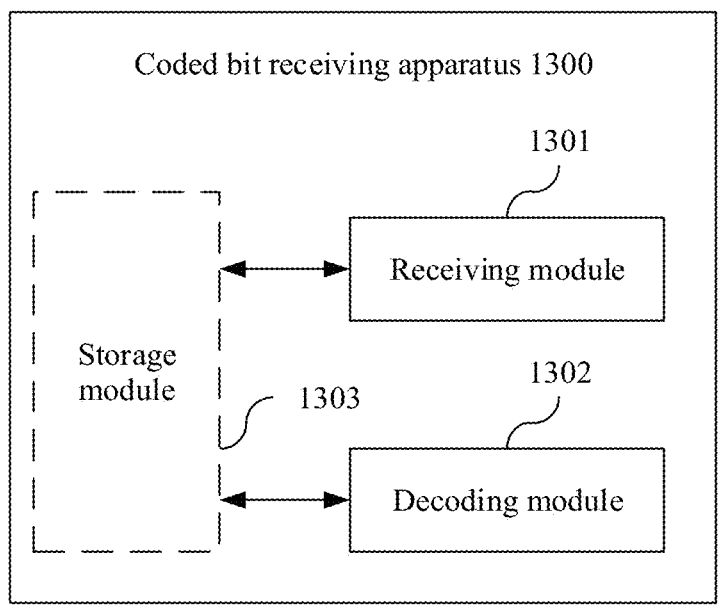
FIG. 13 is a schematic structural diagram of a coded bit receiving apparatus according to an embodiment of this application.

FIG. 13 is a possible schematic structural diagram of the coded bit receiving apparatus. The receiving apparatus includes a receiving module 1301 and a decoding module 1302. The receiving module 1301 and the decoding module 1302 perform corresponding steps in the foregoing corresponding methods. It should be understood that the coded bit receiving apparatus in FIG. 13 has any function of the coded bit receiving apparatus in the foregoing corresponding methods. Optionally, as shown in FIG. 13, the receiving apparatus may further include a storage module 1303, configured to store received coded bits and decoded bits.

This application further provides a communications system, including one or more network devices and/or one or more terminal devices.

It should be understood that, the processor in the embodiments of this application may be a central processing unit (CPU), or may further be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor, or the processor may be any conventional processor or the like.

It may be understood that the memory in the embodiments of this application may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM), used as an external cache. Through example but not limitative description, many forms of RAMs may be used, for example, a static RAM (SRAM), a dynamic RAM (DRAM), a synchronous DRAM (SDRAM), a double data rate (DDR) SDRAM (DDR SDRAM), an enhanced SDRAM (ESDRAM), a synchronous link DRAM (SLDRAM), and a direct rambus (DR) dynamic RAM.

All or some of the foregoing embodiments may be implemented through software, hardware (for example, a circuit), firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, but may also indicate an "and/or" relationship. For details, refer to a context for understanding.

In this application, "at least one" means one or more, and "plurality" means at least two. "At least one of the following" or a similar expression thereof indicates any combination of the following, and includes any combination of one or more of the following. For example, at least one of a, b, or c may indicate a, b, c, a and b, a and c, b and c, or a, b, and c, where a, b, and c may be singular or plural.

It should be understood that sequence numbers of the foregoing processes do not mean execution sequences in the various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A coded bit distribution apparatus, comprising:
a processor; and
a memory coupled to the processor and configured to store a computer program that, when executed by the processor, causes the coded bit distribution apparatus to:
generate coded bits by performing channel coding on information bits according to a used modulation and coding scheme (MCS), wherein the used MCS is for each of a plurality of resource units configured for an orthogonal frequency-division multiple access (OFDMA) transmission; and
distribute, according to a distribution rule, the coded bits to the plurality of resource units by distributing a quantity of coded bits to the plurality of resource units in a cyclic polling manner,
wherein the quantity of coded bits to the plurality of resource units meets a preset relationship, wherein the preset relationship is as follows:

$$S_i = N_i \times \max\left(1, \frac{s_i}{2}\right),$$

wherein $S_i$ is a quantity of coded bits distributed to the $i^{th}$ resource unit at a time, wherein $N_i$ is a quantity of preset resource units in the $i^{th}$ resource unit, wherein $i \leq M$, wherein M is a quantity of the plurality of resource units, and wherein $s_i$ is a modulation order of constellation point mapping in an MCS for the $i^{th}$ resource unit.

2. The coded bit distribution apparatus of claim 1, wherein a same MCS is used for the plurality of resource units for the OFDMA transmission.

3. The coded bit distribution apparatus of claim 1, wherein the coded bit distribution apparatus is further configured to distribute the coded bits according to the distribution rule by:
stopping distributing coded bits to the at least one of the plurality of resource units when at least one of the plurality of resource units is fully loaded with coded bits distributed to the resource unit;
continuing to distribute coded bits to one or more other resource units in the plurality of resource units according to the distribution rule; and
continuing to perform a next round of distribution after all the plurality of resource units are fully loaded with coded bits distributed to the resource units.

4. The coded bit distribution apparatus of claim 1, wherein the processor comprises a resource unit parser that distributes the coded bits, and wherein the resource unit parser is located after a stream parser when there are a plurality of streams.

5. The coded bit distribution apparatus of claim 1, wherein resource units in the plurality of resource units are continuous or discontinuous in a frequency domain.

6. The coded bit distribution apparatus of claim 1, wherein resource units in the plurality of resource units are allocated to one station or one set of stations.

7. The coded bit distribution apparatus of claim 1, wherein the quantity of preset resource units is a positive integer obtained by rounding off a quotient of a quantity of tones in the $i^{th}$ plurality of resource units and a quantity of tones in a preset resource unit.

8. The coded bit distribution apparatus of claim 7, wherein the preset resource unit is a minimum resource unit among the plurality of resource units.

9. A coded bit receiving apparatus, comprising:
a processor; and
a memory coupled to the processor and configured to store a computer program that, when executed by processor, causes the coded bit receiving apparatus to:
receive, according to a receiving and combination rule, coded bits that are carried in a plurality of resource units used for an orthogonal frequency-division multiple access (OFDMA) transmission; and
generate information bits by performing channel decoding on the coded bits according to a used modulation and coding scheme (MCS), wherein the used MCS is for each of the plurality of resource units, wherein receiving the coded bits according to the receiving and combination rule comprises receiving a quantity of coded bits from the plurality of resource units in a cyclic polling manner, wherein the quantity of coded bits to the plurality of resource units meets a preset relationship, wherein the preset relationship is as follows:

$$S_i = N_i \times \max\left(1, \frac{s_i}{2}\right),$$

wherein $S_i$ is a quantity of coded bits received from an $i^{th}$ resource unit at a time, wherein $N_i$ is a quantity of preset resource units in the $i^{th}$ resource unit, wherein i≤M, wherein M is a quantity of the plurality of resource units, and wherein $s_i$ is a modulation order of constellation point mapping in an MCS for the $i^{th}$ resource unit.

10. The coded bit receiving apparatus of claim 9, wherein a same MCS is used for the plurality of resource units for the OFDMA transmission.

11. The coded bit receiving apparatus of claim 9, wherein the coded bit receiving apparatus is configured to receive the coded bits according to the receiving and combination rule by:
  stopping receiving coded bits from the at least one of the plurality of resource units when all coded bits carried in at least one of the plurality of resource units are received;
  continuing to receive coded bits from one or more other resource units in the plurality of resource units according to the receiving and combination rule; and
  continuing to perform a next round of receiving after all coded bits carried in the plurality of resource units are received.

12. The coded bit receiving apparatus of claim 9, wherein resource units in the plurality of resource units are continuous or discontinuous in a frequency domain.

13. The coded bit receiving apparatus of claim 9, wherein resource units in the plurality of resource units are allocated to one station or one set of stations.

14. The coded bit receiving apparatus of claim 9, wherein the quantity of preset resource units is a positive integer obtained by rounding off a quotient of a quantity of tones in the $i^{th}$ plurality of resource units and a quantity of tones in a preset resource unit.

15. The coded bit receiving apparatus of claim 14, wherein the preset resource unit is a minimum resource unit among the plurality of resource units.

16. A coded bit distribution apparatus, comprising:
  a processor; and
  a memory coupled to the processor and configured to store a computer program that, when executed by the processor, causes the coded bit distribution apparatus to:
    generate coded bits by performing channel coding on information bits according to a used modulation and coding scheme (MCS), wherein the used MCS is for each of a plurality of channel sets configured for a single-user preamble puncturing transmission; and
    distribute, according to a distribution rule, the coded bits to the plurality of channel sets by distributing a quantity of coded bits to the plurality of channel sets in a cyclic polling manner,
  wherein the quantity of coded bits to the plurality of channel sets meets a preset relationship, wherein the preset relationship is as follows:

$$S_i = N_i \times \max\left(1, \frac{s_i}{2}\right),$$

wherein $S_i$ is a quantity of coded bits distributed to an $i^{th}$ channel set at a time, wherein $N_i$ is a quantity of preset channels in the $i^{th}$ channel set, wherein i≤M, wherein M is a quantity of the plurality of channel sets, and wherein $s_i$ is a modulation order of constellation point mapping in an MCS for the $it^h$ channel set.

17. The coded bit distribution apparatus of claim 16, wherein the coded bit distribution apparatus is configured to distribute the coded bits according to the distribution rule by:
  stopping distributing coded bits to at least one channel set in the plurality of channel sets when the at least one channel set is fully loaded with coded bits distributed to the at least one channel set;
  continuing to distribute coded bits to one or more other channel sets in the plurality of channel sets according to the distribution rule; and
  continuing to perform a next round of distribution after all channel sets in the plurality of channel sets are fully loaded with coded bits distributed to all the channel sets.

18. The coded bit distribution apparatus of claim 16, wherein the preset channels comprise a channel whose bandwidth is a common divisor of bandwidths of the plurality of channel sets.

19. The coded bit distribution apparatus of claim 16, wherein channel sets in the plurality of channel sets are continuous or discontinuous in a frequency domain.

20. The coded bit distribution apparatus of claim 16, wherein channel sets in the plurality of channel sets comprise at least one of a 20 megahertz (MHz) bandwidth, a 40 MHz bandwidth, a 80 MHz bandwidth, or a 160 MHz bandwidth.

21. A coded bit receiving apparatus, comprising:
  a processor; and
  a memory coupled to the processor and configured to store a computer program that, when executed by processor, causes the coded bit receiving apparatus to:
    receive, according to a receiving and combination rule, coded bits carried in a plurality of channel sets used for a single-user preamble puncturing transmission; and
    generate information bits by performing channel decoding on the coded bits according to a used modulation and coding scheme (MCS), wherein the used MCS is for each of the plurality of channel sets,
  wherein receiving the coded bits according to the receiving and combination rule comprises receiving a quantity of coded bits from the plurality of channel sets in a cyclic polling manner, wherein the quantity of coded bits from the plurality of channel sets meets a preset relationship, wherein the preset relationship is as follows:

$$S_i = N_i \times \max\left(1, \frac{s_i}{2}\right),$$

wherein $S_i$ is a quantity of coded bits distributed to an $i^{th}$ channel set at a time, wherein $N_i$ is a quantity of preset channels in the $i^{th}$ channel set, wherein i≤M, wherein M is a quantity of the plurality of channel sets, and wherein $s_i$ is a modulation order of constellation point mapping in an MCS for the $i^{th}$ channel set.

22. The coded bit receiving apparatus of claim 21, wherein the coded bit receiving apparatus is configured to receive the coded bits according to the receiving and combination rule further by:

stopping receiving coded bits from at least one channel set in the plurality of channel sets when all coded bits carried in the at least one of the channel set are received;

continuing to receive coded bits from one or more other channel sets in the plurality of channel sets according to the receiving and combination rule; and continuing to perform a next round of receiving after all coded bits carried in the plurality of channel sets are received.

23. The coded bit receiving apparatus of claim 21, wherein each of the preset channels is a channel whose bandwidth is a common divisor of bandwidths of the plurality of channel sets.

24. The coded bit receiving apparatus of claim 21, wherein channel sets in the plurality of channel sets are continuous or discontinuous in a frequency domain.

25. The coded bit receiving apparatus of claim 21, wherein channel sets in the plurality of channel sets comprise at least one of a 20 megahertz (MHz) bandwidth, a 40 MHz bandwidth, a 80 MHz bandwidth, or a 160 MHz bandwidth.

* * * * *

UNITED STATES PATENT AND TRADEMARK OFFICE
CERTIFICATE OF CORRECTION

| | |
|---|---|
| PATENT NO. | : 11,569,928 B2 |
| APPLICATION NO. | : 17/141847 |
| DATED | : January 31, 2023 |
| INVENTOR(S) | : Ming Gan, Wei Lin and Xun Yang |

It is certified that error appears in the above-identified patent and that said Letters Patent is hereby corrected as shown below:

In the Claims

Claim 16, Column 46, Line 19: "for the i$t^h$ channel" should read "for the i$^{th}$ channel"

Signed and Sealed this
Twenty-first Day of March, 2023

Katherine Kelly Vidal
*Director of the United States Patent and Trademark Office*